United States Patent
Thomas et al.

(10) Patent No.: US 10,674,185 B2
(45) Date of Patent: Jun. 2, 2020

(54) ENHANCING A REGION OF INTEREST IN VIDEO FRAMES OF A VIDEO STREAM

(71) Applicant: Koninklijke KPN N.V., Rotterdam (NL)

(72) Inventors: Emmanuel Thomas, Delft (NL); Ray Van Brandenburg, Rotterdam (NL); Mattijs Oskar Van Deventer, Leidschendam (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 15/765,193

(22) PCT Filed: Oct. 7, 2016

(86) PCT No.: PCT/EP2016/073994
§ 371 (c)(1),
(2) Date: Mar. 30, 2018

(87) PCT Pub. No.: WO2017/060423
PCT Pub. Date: Apr. 13, 2017

(65) Prior Publication Data
US 2018/0295400 A1    Oct. 11, 2018

(30) Foreign Application Priority Data
Oct. 8, 2015   (EP) .................................... 15188984

(51) Int. Cl.
*H04N 21/2343*   (2011.01)
*H04N 21/854*   (2011.01)
(Continued)

(52) U.S. Cl.
CPC ... *H04N 21/234327* (2013.01); *H04N 19/167* (2014.11); *H04N 19/187* (2014.11); *H04N 19/30* (2014.11); *H04N 21/85406* (2013.01)

(58) Field of Classification Search
CPC ......... H04N 21/234327; H04N 19/167; H04N 19/187
See application file for complete search history.

(56) References Cited

U.S. PATENT DOCUMENTS

| 7,894,531 B1 | 2/2011 | Cetin et al. |
| 9,699,465 B2 | 7/2017 | Ouedraogo |

(Continued)

FOREIGN PATENT DOCUMENTS

| EP | 1672925 A1 | 6/2006 |
| EP | 2775701 A1 | 9/2014 |

(Continued)

OTHER PUBLICATIONS

Concolato, C., et al., "Usage of DASH SRD for HEVC Tiling," ISO Contribution ISO/IEC JTC1/SC29/WG11 MPEG2014 (2014).
(Continued)

*Primary Examiner* — Jonathan R Messmore
(74) *Attorney, Agent, or Firm* — Hamilton, Brook, Smith & Reynolds, P.C.

(57) ABSTRACT

A method for enhancing a region of interest in video frames of a video stream is described. The method includes receiving media data defining base video frames of at least one base stream, said base stream being associated with one or more enhancement tile streams, an enhancement tile stream comprising media data defining tiled video frames comprising a tile, said tile comprising media data for enhancing visual content in a subregion of the image region of the base video frames; requesting media data of one or more enhancement tile streams, preferably one or more HEVC enhancement tile streams, the one or more enhancement tile streams being associated with media data for enhancing visual content in the at least one region of interest; generating base video frames on the basis of media data of the at least one base stream and generating tiled video frames on (Continued)

the basis of media data of the one or more enhancement tile streams, the tiled video frames comprising one or more tiles forming visual content the at least one region of interest; and, replacing or blending at least part of the visual content of said at least one region of interest in the video frames of said base stream with at least part of said enhanced visual content of the tiled video frames.

14 Claims, 10 Drawing Sheets

(51) Int. Cl.
*H04N 19/30* (2014.01)
*H04N 19/187* (2014.01)
*H04N 19/167* (2014.01)

(56) References Cited

U.S. PATENT DOCUMENTS

| | | | |
|---|---|---|---|
| 9,749,627 | B2 | 8/2017 | Wu |
| 9,794,649 | B2 | 10/2017 | Denoual et al. |
| 9,860,572 | B2 | 1/2018 | van Deventer et al. |
| 9,883,011 | B2 | 1/2018 | Denoual et al. |
| 9,906,807 | B2 | 2/2018 | Denoual et al. |
| 10,182,241 | B2 | 1/2019 | Li et al. |
| 10,200,721 | B2 | 2/2019 | Denoual et al. |
| 10,212,491 | B2 | 2/2019 | Denoual et al. |
| 10,257,247 | B2 | 4/2019 | Denoual et al. |
| 10,397,666 | B2 | 8/2019 | Thomas |
| 10,542,258 | B2 | 1/2020 | Wang et al. |
| 10,542,274 | B2 | 1/2020 | Li |
| 10,547,914 | B2 | 1/2020 | Denoual et al. |
| 2006/0120610 | A1 | 6/2006 | Kong et al. |
| 2006/0262345 | A1 | 11/2006 | Le Leannec et al. |
| 2009/0300692 | A1 | 12/2009 | Mavlankar et al. |
| 2010/0135575 | A1 | 6/2010 | Guo |
| 2010/0232504 | A1 | 9/2010 | Feng |
| 2011/0096990 | A1 | 4/2011 | Lu |
| 2013/0235270 | A1 | 9/2013 | Sasaki et al. |
| 2014/0079126 | A1 | 3/2014 | Ye et al. |
| 2014/0089990 | A1 | 3/2014 | van Deventer et al. |
| 2014/0341549 | A1 | 11/2014 | Hattori |
| 2015/0032901 | A1 | 1/2015 | Wang et al. |
| 2015/0095450 | A1 | 4/2015 | Vitthaladevun |
| 2015/0208103 | A1 | 7/2015 | Guntur et al. |
| 2015/0237166 | A1 | 8/2015 | Denoual et al. |
| 2015/0264404 | A1* | 9/2015 | Hannuksela ........... H04N 19/70 375/240.16 |
| 2016/0165309 | A1 | 6/2016 | Thomas et al. |
| 2016/0182927 | A1 | 6/2016 | Denoual et al. |
| 2017/0013279 | A1 | 1/2017 | Puri |
| 2017/0118540 | A1 | 4/2017 | Thomas et al. |
| 2017/0155912 | A1 | 6/2017 | Thomas et al. |
| 2017/0180444 | A1 | 6/2017 | Denoual et al. |
| 2017/0223083 | A1 | 8/2017 | Ouedraogo |
| 2018/0242028 | A1 | 8/2018 | Van Brandenburg et al. |
| 2019/0208234 | A1 | 7/2019 | Van Brandenburg et al. |

FOREIGN PATENT DOCUMENTS

| | | |
|---|---|---|
| EP | 2 814 243 A | 12/2014 |
| GB | 2505912 A | 3/2014 |
| GB | 2 513 139 | 10/2014 |
| GB | 2524531 A | 9/2015 |
| JP | 2005-142654 | 6/2005 |
| JP | 2012-049806 | 3/2012 |
| WO | WO 2001/95513 | 12/2001 |
| WO | WO 2008/088772 | 7/2008 |
| WO | WO 2009/003885 | 1/2009 |
| WO | WO 2012/168356 | 12/2012 |
| WO | WO 2012/168365 | 12/2012 |
| WO | WO 2013/063094 | 5/2013 |
| WO | WO 2014/057131 | 4/2014 |
| WO | 2014/106651 A1 | 7/2014 |
| WO | 2014/111423 | 7/2014 |
| WO | 2014/168972 A1 | 10/2014 |
| WO | WO 2015/004276 A2 | 1/2015 |
| WO | WO 2015/008774 A1 | 1/2015 |
| WO | WO 2015/011109 | 1/2015 |
| WO | WO 2015/014773 | 2/2015 |
| WO | 2015/059194 A1 | 4/2015 |
| WO | 2015/014451 A1 | 7/2015 |
| WO | WO 2015/197815 | 12/2015 |
| WO | WO 2015/197818 | 12/2015 |
| WO | WO 2017/029400 | 2/2017 |
| WO | WO 2017/029402 | 2/2017 |
| WO | 2017/060423 A1 | 4/2017 |

OTHER PUBLICATIONS

Giladi, A. et al, "Descriptions of Core Experiments on DASH Amendment," Systems subgroup/DASH, International Organisation for Stardardisation Organisation Internationale de Normalisation ISO/IEC JTC1/SC29/WG11 Coding of Moving Pictures and Audio, ISO/IEC JTC1/SC29/WG11 MPEG2013/N13977, Geneva, Switzerland, 24 pages (Nov. 2013).

Hannuksela, M.M., et al., (listed on the EP Search Report & ISR as Gabbouj, for EP 14174815.2) "Isolated Regions in Video Coding," IEEE Transactions on Multimedia, 6(2): 259-267 (Apr. 1, 2004).

Hirabayashi, M. et al, "Improvement on HEVC Tile Track for WD of 14496-15 AMD1," Sony Corporation Proposal, International Organisation for Stardardisation Organisation Internationale de Normalisation ISO/IEC JTC1/SC29/WG11 Coding of Moving Pictures and Audio, ISO/TEC JTC1/SC29/WG11 MPEG2014/M33083, Valencia, Spain, 4 pages (Mar. 2014).

Hirabayashi, M., et al., "Consideration on HEVC Tile Tracks in MPD for DASH SRD," ISO Contribution ISO/IEC JTC1/SC29/WG11 MPEG2014 (2014).

Le Feuvre, J., et al., "Support for Efficient Tile Access in the HEVC File Format," Telecom Paris Tech, Canon Research Centre France (2013).

Mavlankar, A., et al., (listed on the EP Search Report as Yan Ye) "An Interactive Region-of-Interest Video Streaming System for Online Lecture Viewing," Information Systems Laboratory, Department of Electrical Engineering, Stanford University, Proc. of 18th International Packet Video Workshop, pp. 64-71, Dec. 2010.

Sanchez, et al., "Low Complexity Cloud-video-mising using HEVC," 11th annual IEEE CCNC—Multimedia networking, services and applications, 214-218 (2014). (noted within spec for PCT/EP2016/069735).

Tokumo, Y, et al., "Dash: Signaling Tile Encapsulation Modes," ISO Contribution ISO/IEC JTC1/SC29/WG11 MPEG2014 (2014).

Wang, Y-K., et al., "Tile Groups," Joint Collaborative Team on Vide Coding (JCT-VC) of ITU-T SG16 WP3 and ISO/IEC JTC1/SC29/WG11, 7th Meeting: Geneva, CH, pp. 1-9 (Nov. 21-30, 2011).

Ye, Y., et al., "ROI Tile Sections," MPEG Meeting, Shanghai, pp. 1-7 (2012).

European Patent Office Extended Search Report for Application No. 15188984.7-1502 dated Apr. 4, 2016.

International Search Report and Written Opinion dated Dec. 22, 2016 for International Application No. PCT/EP2016/073994, entitled "Enhancing a Region of Interest in Video Frames of a Video Stream".

Lee, et al., "Scalable roi Algorithm for H.264/SVC-based Video Streaming," Consumer Electronics, IEEE Transactions 57(2): 882-887 (2011).

* cited by examiner

ENHANCING A REGION OF INTEREST IN VIDEO FRAMES OF A VIDEO STREAM

This application is the U.S. National Stage of International Application No. PCT/EP2016/073994, filed Oct. 7, 2016, which designates the U.S., published in English, and claims priority under 35 U.S.C. § 119 or 365(c) to European Application No. 15188984.7, filed Oct. 8, 2015. The entire teachings of the above applications are incorporated herein by reference.

FIELD OF THE INVENTION

The invention relates to enhancing at least one region of interest in video frames of a video stream, and, in particular, though not exclusively, to methods and systems for enhancing at least one region of interest in video frames of a video stream, a media device for enhancing at least one region of interest in video frames of a video stream, data structures for enabling a media device to enhance at least one region of interest in video frames of a video stream and a computer program product for executing such methods.

BACKGROUND OF THE INVENTION

In certain video applications, such as applications related to Virtual Reality (VR) and 360 degree video, there may be a desire to enhance areas in the video frames of a media stream, which are of interest to the viewer. Such an area may be referred to as a Region of Interest (ROI). Known techniques for determining a ROI in an image area are content-based. Typically, the content in the video frames is analysed using e.g. object tracking, optical flows (motion in the video), face detection, car detection, etc. Thereafter, a detected ROI may be processed in order to enhance the video quality within the ROI.

One approach to achieve such local quality enhancement in video images is a technique, which is referred to as ROI-based video coding. ROI-based video coding may be combined with Scalable Video Coding (SVC), which is an extension of the video coding standard MPEG-4 part 10 AVC/H.264, which enables a multi-layer coding scheme. In its simplest usage, the original video is encoded in different dependent layers providing different quality levels and resolutions, e.g. a base layer and one or more enhancement layers wherein the base layer provides the lowest quality and wherein enhancement layers only comprises residual information (i.e. the high quality minus low quality information) in encoded form so that the base layer combined with an enhancement layer produces high quality video frames. Hence, if the user wants more quality, the SVC decoder will have to decode the base layer plus the first enhancement layer, whereby the decoding of the enhancement layer depends on the base layer. Similarly, decoding the base layer in combination with the first and second enhancement layer will procedure an even higher quality video. By higher quality video we mean either a higher spatial resolution, i.e. more pixels, or an higher signal-to-noise ratio (SNR) which reproduces the original source video with more fidelity. Both enhancements contributes to a higher video quality perceived by the human eye.

The article by Jung-Hwan Lee; Yoo, C., "Scalable roi algorithm for H.264/SVC-based video streaming," in *Consumer Electronics, IEEE Transactions on*, vol. 57, no. 2, pp. 882-887, May 2011, a technique is described to enhance ROIs of a video stream by making use of the SVC video coding standard wherein the base layer is used to encode the video in an acceptable quality. Additionally, an enhancement layer is produced only comprising a ROI that is encoded in a higher quality. As a result, the different enhancement layers only cover part of the full image areas of the video frames of the base layer. The ROI enhancement layers are contained in concentric slices whose shapes are enabled by the Flexible Macroblock Ordering (FMO) feature as described in MPEG-4 part AVC/H.264. In this prior art technique, the decoding of the enhancement layer depends on the availability of the base layer.

One problem associated with ROI-based video coding is that it relies on a-priori knowledge about ROIs in which viewer are interested. When using high-density panorama-type or immersive-type video, the number of detected objects and associated ROIs may increase substantially and the availability of such a-priory knowledge can no longer be maintained. For example, different users may be interested in different ROI, e.g. in video surveillance, a first police officer may want to have high quality view on cars (in particular license plates) in an image while another second police officer may be solely interested in high quality view of the face of pedestrians. In such situation an enhancement layer may be generated comprising both ROIs so that a first user will receive the information on the ROI of a second user and vice-versa thereby causing waste of bandwidth. Even though multiple layers may be produced on the basis of a number of user profiles, at the end such approach does not provide a scalable solution. With hundreds of users, it is not computationally efficient to produce hundreds of enhancement layers. As a consequence, a lot of areas that are initially identified as a ROI, decoded as part of an enhancement layer and transmitted to a client will—at the end—not be relevant for a user. Thus causing a substantial waste of bandwidth. In other applications, the above-mentioned a-prior knowledge on ROIs simply does not exist. For example, in context-based applications such as gaze detection or in user interface applications wherein a user select one or more ROIs there is no way to know at the encoding stage which parts of the image region of video frames will be a ROI. In such applications, existing ROI-based video coding schemes cannot be used.

WO2014111423 describes a system for providing a video comprising a High Quality (HQ) ROI of an increased video quality. WO2014111423 proposes two basic solutions to achieve this. One solution is based on a scalable video codec such as the SVC extension to AVC. In this solution from a source video, encoded video streams are generated each comprising a base layer covering the full image view of the source video and at least one enhancement layer comprising a portion (tile) of the full image view. Decoding of each video stream requires an independent decoding instance and decoding of the enhancement layer of each video stream also requires the availability of the base layer covering the full image view. Formation of a decoded video stream comprising a HQ ROI includes selection of enhancement layers that comprise one or more HQ tiles covering the ROI, individual decoding by separate decoding instances of each selected enhancement layer on the basis of the base layer in order to form a number of video frames each comprising one or more HQ tiles at different positions and finally combining the video frames into a video frame comprising the HQ ROI.

In the alternative solution, that doesn't make use of a scalable video codec, a number of different elementary streams are generated, with each time an encoded video, with for each elementary stream a different high quality tile and the remainder of the tiles in low quality. Formation of a decoded video stream comprising a HQ ROI includes selection of the appropriate elementary streams comprising the one or more HQ tiles needed to cover the ROI, individual decoding by separate decoding instances of each selected elementary stream on the basis of the base layer in order to form a number of video frames each comprising one or more HQ tiles at different positions and finally combining the video frames into a video frame comprising the HQ ROI.

In both the disclosed solutions, the combining is performed through signalling that the HQ tiles should be overlayed (e.g. super-imposed/placed on top of/placed in front of) on the portion of the base layer image covered by the HQ tiles during combination for display.

The proposed solutions requires parallel decoding of media data in order to form multiple video frames each comprising one (or more) HQ tiles and subsequent combination of the multiple video frames into a video frame comprising an HQ ROI. As a result, the number of required parallel decoding processes/instances of independent video streams which may or may not comprise enhancement layers, scales linearly with the number of required HQ tiles needed to cover a selected ROI, or selected ROI's. Therefore when increasing the number of tiles and the number of simultaneously selectable ROIs such scheme would require a substantial amount of decoding instances running in parallel which constrains the number of simultaneously selectable ROI's and the granularity of the tile grid (e.g. the number of available tiles) to the device capabilities.

More particularly, in WO2014111423 the burden on the client increases linearly with the number of decoded tiles. This is problematic as a ROI enhancement application typically requires a fine selection of the region that needs to be enhanced in order to adapt to the shape of the content (e.g. a truck in a video surveillance). Hence, in such application a fine tiling grid of the original video is desired. As a consequence, it is very likely that the client has to separately retrieve and decode for instance nine or more elementary streams/enhancement layers in order to form one video frame comprising an enhanced ROI. Decoding that many elementary streams/enhancement layers however is computationally intensive and challenging for memory management as for each elementary stream/enhancement layer a separate decoding pipeline is required. Moreover, when combining the decoded video frames into a video frame comprising an HQ ROI a substantial amount of decoded media data is not used in the resulting video frame thereby rendering the decoding process inefficient in terms of decoding resources.

In addition the proposed 'scalable video codec' solution in WO2014111423, as described above, is dependent on the client device having a decoder supporting a scalable video codec.

Moreso the alternative solution proposed by WO2014111423, which is based on a non-scalable codec, proposes elementary streams that each contain, besides a high quality tile, low quality tiles as well. This introduces a significant redundancy in video data, to be retrieved and decoded, which scales linearly with the granularity of the grid of tiles.

Hence, from the above it follows that there is a need in the art for improved methods and systems that enable simple and efficient enhancement of one or more Regions of Interest in video frames of a video stream.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art.

In an aspect the invention may relate to a method for enhancing at least one region of interest in video frames of a video stream comprising: receiving media data defining base video frames of at least one base stream, said base stream being associated with one or more enhancement tile streams, wherein an enhancement tile stream comprises media data defining tiled video frames, a tiled video frame comprising a tile associated with media data for enhancing visual content in a subregion of an image region of a base video frame; requesting media data of one or more enhancement tile streams, preferably one or more HEVC enhancement tile streams, the one or more tiles of the tiled video frames of the requested media data being associated with at least one predetermined region of interest in the image region of the base video frames, said predetermined region of interest preferably determined on the basis of a user input received by a media device, wherein said media device is preferably configured for executing the method according to the various embodiments of the invention; generating base video frames on the basis of the media data of the at least one base stream and generating tiled video frames on the basis of the requested media data of the one or more enhancement tile streams, the generated tiled video frames comprising one or more tiles forming enhanced visual content in the at least one region of interest; and, forming video frames comprising an enhanced region of interest by modifying at least part of the visual content of the at least one region of interest in the video frames of said base stream on the basis of the enhanced visual content of the tiled video frames, wherein said modifying preferably comprises replacing or blending at least part of the visual content of the at least one region of interest in the video frames of said base stream with the enhanced visual content of the tiled video frames.

Hence the method according to the invention is preferably executed by a media device, wherein the media device comprise at least one processor, memory space, and functionality, in the form of hardware and/or software, for requesting base streams and enhancement tile streams each comprising media data. This latter functionality is embodied in a client device.

According to embodiments of the invention the media device may further comprises functionality which may be embodied as hardware and/or software for preparing the received mediadata for decoding and for decoding the received mediadata. Such functionality may be referred to as a media engine, and constitutes at least two decoders. Each of these at least two decoders may be embodied in hardware, software, or a combination thereof. The preparing preferably comprises forming a bitstream compliant with (e.g. and for input to) a first decoder on the basis of received mediadata of the base stream, and forming at least one bitstream that is compliant with (e.g. and for input to) at least one further decoder on the basis of received media data of at least one enhancement tile stream.

According to further embodiments of the invention, the media device may also comprise functionality for forming video frames comprising one or more enhanced regions of interest according to the invention. Such functionality may be referred to as a rendering engine or rendering device, which may be embodied as hardware and/or software.

In embodiments of the invention, media data of an enhancement tile stream is configured for being independently decodable from the base stream. This allows for parallel processing (decoding) of the base stream and of the one or more enhancement tile streams by different decoders, and allows for the use of different codecs for the base stream and for the one or more enhancement tile streams.

In further embodiments of the invention the requested media data from the one or more enhancement tile streams originates from a single video encoding process, the single video encoding process being preferably based on the HEVC video-coding standard.

The advantage of requesting media data as defined above, is that through their common encoding origin, they may be merged into one single bitstream for input to a single decoder (e.g. a HEVC decoder), which limits the number of required decoder instances for decoding the enhancement tile streams.

The invention may thus leverage the tile feature defined in recent video coding standards such as the HEVC video-coding standard.

In an embodiment, the media data of a base stream may be encoded on the basis of a first codec and the base video frames may be generated by a first decoder. In an embodiment, the media data of an enhancement tile stream may be encoded on the basis of a second codec that is different from said first codec, the second codec supporting tiled video frames (for example HEVC, VP9, AVC or a codec derived from or based on one of these codecs) and the tiled video frames may be generated by a second decoder.

The tile feature of such codecs allow encoding of high quality video data in a tiled video stream wherein the media data of the tiled video stream may be stored as individual tile tracks such that media data associated with one or more tiles can be individually accessed and streamed as one or more enhancement tile streams to a media device. The media data of multiple enhancement tile streams can be efficiently decoded by a single decoder, preferably a HEVC decoder, into tiled video frames comprising enhanced visual content (e.g. high quality visual content) at one or more ROIs in the image region of the video frames. The tiles of the tiled video frames associated with different enhancement tile streams are in this embodiment non-overlapping. These tiled video frames comprising enhanced visual content at the position of the one or more ROIs may be easily combined with the video frames of a standard base stream resulting into a video frames comprising enhanced ROIs. A tiling scheme composed of many small tiles enables accurate selection of a set of tiles that cover a ROI (for example the highest level of HEVC bitstreams permits a grid of up to 22×20 tiles).

The invention thus enables a fully personalised enhancement function by determining the positions and sizes of one or more ROI in a base stream (e.g. a standard quality video stream) and subsequently requesting desired enhancement tiles (e.g. of a high quality tiled video stream) associated with one or more ROIs. Thereafter, thus in the decoded domain, the client device may modify the media data in the ROIs of the video frames of the base stream by replacing or blending these with the media data of the enhancement tile streams thus generating one or more enhanced areas (e.g. one or more ROIs of enhanced video quality) in the video frames of the base stream.

In an embodiment of the invention the method comprises receiving blending information for blending media data of the video frames of the base stream with the requested media data of at least one enhancement tile stream, said blending being performed on pixel values in a pixel region of the requested media data and pixel values of media data of the base stream in a corresponding pixel region.

In a further embodiment of the invention the blending information comprises a blending parameter, preferably the blending parameter indicating the percentage, or the weight, of the pixels from the one or more enhancement tile streams, or of the base stream, to be kept in the blending operations.

In a further embodiment the blending information, preferably comprising said blending parameter is being received inside a TrackHeaderBox of at least one enhancement tile stream configured according to the ISO BMFF standard.

In yet a further embodiment, a layer attribute parameter in the TrackHeaderBox of at least one enhancement tile stream configured according to the ISO BMFF standard. is configured to signaling that the enhancement tile stream is an upper-layer. In such embodiment, the blending parameter may be preferably configured to signal the percentage, or the weight, of the pixels from the upper-layer to be kept in the blending operation. And thus the two parameter can be used in combination to signal the blending operation.

It is submitted that enhancement of visual content of one or more subregions in video frames of a base stream is not limited to locally increasing the subjective video quality in a ROI such as enhancing the (parts of the) colour information per pixels or to locally increasing the pixel resolution in a ROI, but also encompasses blurring or hiding ROIs (e.g. faces of persons for privacy reasons), substituting an object or objects identified in a ROI (e.g. substituting persons by a cartoon), locally inserting or substituting visual information (e.g. inserting advertisements), locally inserting error recovery information and/or watermark information in one or more ROIs, etc. Hence, in this application the concept of local video enhancement in the video frames of a base stream using hybrid tiled streaming scheme (hybrid in the sense that video rendering on the basis of a first (conventional) media stream is combined with video rendering on the basis of enhancement tile streams, i.e. video streams comprising tiled video frames) should be construed as any type of local enrichment or purposeful modification of video data in one or more ROIs of video frames of a base stream on the basis of enhancement tile streams.

In an embodiment of the invention the method comprises receiving filtering information for signalling a filtering operation on at least part of the pixels of the frame resulting from the blending operation or resulting from the simple pixel substitution operation, whereby the filtering operation is preferably performed on the basis of a convolution matrix.

In a further embodiment the filtering information is being received inside a MovieHeaderBox of at least one enhancement tile stream configured according to the ISO BMFF standard. Alternatively the filtering information is received as part of a manifest file.

In a further embodiment the filtering information, preferably comprised in a MovieHeaderBox, comprises a filter range parameter signaling to limit the filtering operation to the pixel boundaries of the region affected by substitution or blending only.

In an embodiment the filter range parameter is defined so as to limit the filtering operation to those pixels for which the convolution matrix still covers pixels from the region affected by substitution or blending.

Optionally the filtering information comprises a further 'filter band' parameter signaling the additional band size, preferably in pixels, for applying the filtering operation to. This additional band parameter could be one parameter signaling to apply the filtering operation to both pixels on the inside or on the outside of the boundary of the affected region, or it could be used, by convention, to signal two values, one for pixels on the inside or on the outside of the boundary of the affected region.

In an embodiment, the first and second codec are selected such that the media data of both the base stream and the enhancement tile streams are formatted as independently consumable media streams. Hence, media data of these streams can be independently retrieved and rendered. These streams thus differ from the SVC or SHVC base layer and enhancement layers in the sense that a SVC or a SHVC enhancement layer can only be played out by combining media data of the base layer and the data of the enhancement layer. The enhancement layer according to the SVC or SHVC standards in itself does not contain media data that can be independently used for play-out. In an embodiment, the media data may be requested on the basis of a manifest file comprising at least one base stream identifier and one or more enhancement tile stream identifiers associated with the at least one base stream identifier, preferably a stream identifier comprising (at least part of) an URL or comprising information for determining such URL; the manifest file further comprising tile position information for signaling said client device on the spatial relation between visual content in the video frames of said base stream and visual content in the tiles of the tiled video frames of said one or more enhancement tile streams.

In an embodiment, the tile position information may comprise one or more spatial relationship descriptors (SRDs), a spatial relationship descriptor being associated with a base stream and/or an enhancement tile stream, the spatial relationship descriptor signaling the client device about the position of the visual content in the video frames of the base stream and/or about the position of a tile in the tiled video frames of the tiled enhancement tile stream. As a tile may be further associated with a subregion of the image region of a base video frame, the position, which may also be called 'spatial' position or 'tile position', preferably provides information that may identify the particular subregion of the image region of a base video frame that may be enhanced by the media data associated with the tile.

In an embodiment, the method may comprise: determining ROI position information associated with the at least one region of interest in the video frames of said base stream. In an embodiment, the method may comprise determining one or more enhancement tile streams on the basis of the ROI position information and the tile position information. In an embedment, said determining including determining one or more enhancement tile streams defining one or more tiles that at least partly overlaps with the at least one ROI.

Hence, the manifest file provides the client device with information for requesting media data of a base stream and enhancement tile streams (e.g. for requesting the base stream and enhancement tile stream comprising the desired media data). Further, the manifest file provides the client device with information on the spatial relation between the image region of video frames of a base stream and tiles in the tiled video frames of enhancement tile streams. This way, the client device is capable of determining which enhancement tile streams are needed in order to enhance a region of interest in the image region of the video frames of the base stream.

In an embodiment, the manifest file may comprise enhancement information associated with at least one of the one or more enhancement tile streams, the enhancement information being configured for signaling the client device about the type of enhancement provided by an enhancement tile stream. In an embodiment, the enhancement information may comprise one or more enhancement parameters associated with at least one of the resolution, bitrate, color depth, frame rate of the one or more enhancement tile streams defined by said enhancement tile stream identifiers and/or the base stream by said base stream identifier. The manifest file may comprise information on the type or types of enhancements that can be achieved on the basis of different enhancement tile streams.

In an embodiment, the method may comprise: determining pixel replacement information for signaling the rendering device (also referred to as rendering engine throughout the application) about pixels in the video frames of the base stream which are associated with the least one region of interest in the video frames of the base stream; using the pixel replacement information for replacing or blending pixel information in at least part of the at least one region of interest in the video frames of the base stream with associated pixel information in the video frames of the tiled video frames. In an embodiment, the pixel replacement information may comprise a bitmap. In an embodiment, the pixel replacement information may be at least partly determined on the basis of tile position information provided in a manifest file, and/or on ROI position information. Hence, the pixel replacement information may be used by the rendering engine, in particular the fusion module in the rendering engine, in order to efficiently select the pixels in the video frames of the base stream that need to be replaced with pixels of the enhancement tile streams. The pixel replacement information may include a bitmap defining the pixels of the one or more regions of interest in the video frames of the base stream that need to be replaced or blended with pixels of the enhancement tile streams. The bitmap allows very precise (pixel level) definition of the shape of the region of interest, which may be of any shape.

In an embodiment, said forming comprises:
Prior to said modifying, adjusting said base video frames, preferably the video and/or picture characteristics of said base video frames, on the basis of information on the video and/or picture characteristics of the tiled video frames of the one or more enhancement tile streams, said adjusting preferably comprising upscaling of said video and/or picture characteristics of said base video frames to match the video and/or picture characteristics of the tiled video frames of the one or more enhancement tile streams.

In this embodiment, the video frames of the base stream, after being decoded, need to be adjusted in terms of video and picture characteristics, resulting in adjusted base video frames, after which the pixels of a pixel region in the adjusted base video frames can be modified by replacing or blending with pixels of the tiled video frames associated with the enhancement tile streams in the corresponding pixel region.

In an embodiment, the media data associated with a tile in a first tiled video frame associated with a first enhancement tile stream may be encoded such that the media data do not have any spatial decoding dependency on the media data of one or more other tiles. In another embodiment, the media data of an enhancement tile stream and associated with a tile may be encoded such that the (encoded) media data do not have any temporal decoding dependency on (encoded) media data of one or more tiled video frames preceding the first tiled video frame or following the first tiled video frames. The (encoded) media data of the enhancement tile streams may thus be independently decodable and may be stored in tile tracks that can be independently accessed.

In an embodiment, an enhancement tile stream may comprise media data with enhanced luminance information. It is well known that the human visual system is less sensitive to high frequencies in the colour space compared to black-and-white represented information. For that reason, the luminance channel may be used for enhancing a region of interest.

In one embodiment, the enhancement tile streams may only comprise enhanced luminance information (since enhancing chrominance information will have little impact on the subjective quality). In that case the fusion operation is only executed for one colour channel (the luminance channel) thus resulting in an efficient way of enhancing a region of interest.

In an embodiment, modifying at least part of the visual content of said at least one region of interest may comprise: copying the content of a first video frame buffer comprising a video frame of the base stream into an output frame buffer of the media device; overwriting or blending pixel values associated with the at least one region of interest in the output frame buffer with pixel values at corresponding pixel positions in a second video frame buffer comprising a tiled video frame associated with one or more enhancement tile streams, wherein a binary mask indicates which pixels values in the second video frame buffer needs to be copied into the output frame buffer. The main benefit of this embodiment is that it allows the decoding and fusion operations to be performed asynchronously. In an embodiment, the read and write access to the frame buffers may be conditioned by the grant of a lock. If a resource (e.g. the video frame buffer) is locked (because e.g. the video frame buffer is loaded with data), the fusion process must wait for the resource to be released in order to read data out of the video frame buffer.

In an embodiment, prior to said replacing or blending, adjusting the video and/or picture characteristics of content of the first video frame buffer comprising a video frame of the base stream (e.g. a base video frame), on the basis of the video and/or picture characteristics of a tiled video frame associated with one or more enhancement tile streams, said tiled video frame comprised in said second video frame buffer.

In an embodiment, an enhancement tile stream further comprises tile information for signaling the second decoder to generate tiled video frames, a tiled video frame comprising at least one tile representing a subregion of visual content at a tile position provided by said tile information.

In an embodiment, the manifest file further may further comprise a reference to a base track, the base track being associated with tile stream identifiers defined in said manifest file, the base track comprising metadata in the form of sequence information associated with the order in which media data of the one or more enhancement tile streams defined by said tile stream identifiers need to be combined into a bitstream for the second decoder. The reference to the base track is preferably used for retrieving the metadata associated with the base track.

In an embodiment, said one or more enhancement tile streams are formatted on the basis of a data container of at least one of a media streaming protocol or media transport protocol, an (HTTP) adaptive streaming protocol or a transport protocol for packetized media data, such as the RTP protocol. Such data container may be referred to as a transport container or a media container. A media container is based on a media file format, such as an ISO BMFF based file format. A transport container contains a payload, optionally in the form of at least part of one or more media containers. The media containers contain payload in the form of media data. The media data may be encoded or not. For the purpose of this invention, when the media data is received by a media device, it is encoded, and after being submitted to a decoding process, it is decoded. For clarity purposes the terms encoded and decoded are sometimes explicitly added, although it is understood that the ordinary person skilled in the art, will have no problem in understanding when in this application the term "media data" refers to its encoded or ist decoded form respectively.

In an embodiment, media data of the one or more enhancement tile streams may be encoded on the basis of a codec supporting tiled video frames, preferably said codec being selected from one of: HEVC, VP9, AVC or a codec derived from or based on one of these codecs.

In an embodiment, media data of the one or more enhancement tile streams defined by the one or more enhancement tile stream identifiers may be stored in one or more tile tracks and metadata associated with at least part of the one or more enhancement tile streams may be stored in at least one base track. It is thus understood that the term base track thus refers to metadata as such and not to a base stream containing media data according to the invention.

In an embodiment, the one or more tile tracks and at least one base track have a data container format based on ISO/IEC 14496-12 ISO Base Media File Format (ISOB-MFF) or ISO/IEC 14496-15 Carriage of NAL unit structured video in the ISO Base Media File Format.

In a further aspect, the invention may relate to a computer, preferably a media device, comprising: a computer readable storage medium having computer readable program code embodied therewith, and a processor, preferably a microprocessor, coupled to the computer readable storage medium, wherein responsive to executing the computer readable program code, the processor is configured to perform executable operations comprising:

receiving media data defining base video frames of at least one base stream, said base stream being associated with one or more enhancement tile streams, wherein an enhancement tile stream comprises media data defining tiled video frames, a tiled video frame comprising a tile associated with media data for enhancing visual content in a subregion of an image region of a base video frame; requesting media data of one or more enhancement tile streams, preferably one or more HEVC enhancement tile streams, the one or more tiles of the tiled video frames of the requested media data being associated with at least one predetermined region of interest in the image region of the base video frames; generating base video frames on the basis of the media data of the at least one base stream and generating tiled video frames on the basis of the media data of the one or more enhancement tile streams, the generated tiled video frames comprising one or more tiles forming enhanced visual content in the at least one region of interest; and, forming video frames comprising an enhanced region of interest by replacing or blending at least part of the visual content of the at least one region of interest in the video frames of said base stream with at least part of the enhanced visual content of the tiled video frames.

In another aspect, the invention may relate to a non-transitory computer-readable storage media comprising a data structure for enabling enhancement of a region of interest in video frames of a video stream, said data structure comprising computer readable program code, said code comprising: at least one base stream identifier and one or more enhancement tile stream identifiers associated with the at least one base stream identifier, preferably a stream identifier comprising (at least part of) an URL or comprising information for determining such URL, for enabling a client device to request a base stream and/or one or more enhancement tile streams;

tile position information for signaling the client device on the spatial relation between visual content in the video frames of the base stream and visual content in the tiles of the tiled video frames of the one or more enhancement tile streams, preferably said position information comprising one or more spatial relationship descriptors (SRDs), a spatial relationship descriptor being associated with a base stream and/or an enhancement tile streams, the spatial relationship descriptor signaling the client device about the position of the visual content in the video frames of the base stream and/or about the position of a tile in the tiled video frames of the tiled enhancement tile stream.

In a further embodiment, said code may comprise enhancement information associated with at least one of the one or more enhancement tile streams, the enhancement information signaling the client device about the type of enhancement provided by an enhancement tile stream, and, optionally, for providing the client device one or more enhancement parameters associated with at least one of the resolution, bitrate, color depth, frame rate of the one or more enhancement tile streams defined by said enhancement tile stream identifiers.

The invention may also relate to a program product comprising software code portions configured for, when run in the memory of a computer, executing the method steps as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
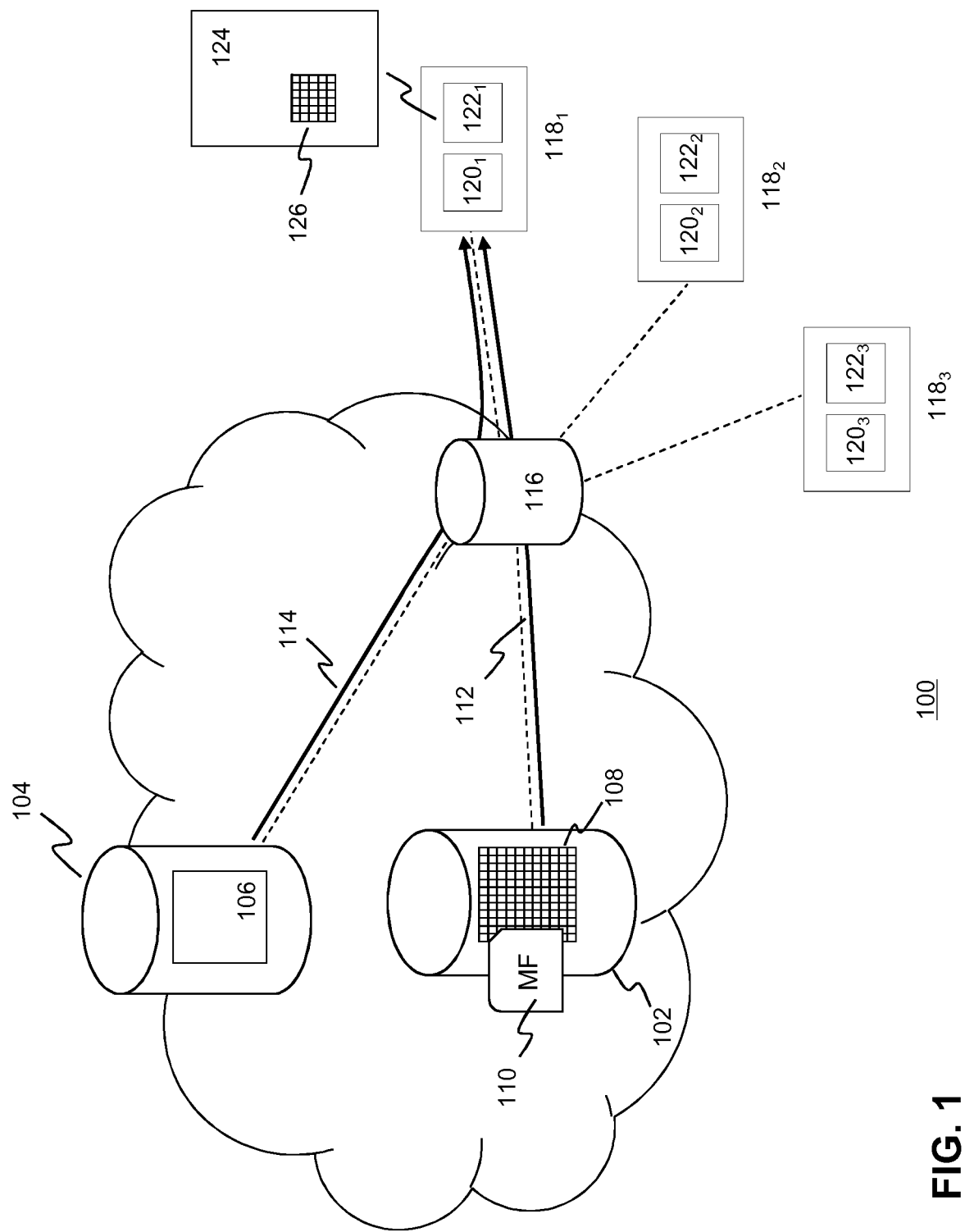
FIG. 1 schematically depicts a system for hybrid tiled streaming according to an embodiment of the invention.

FIG. 1 schematically depicts a system for hybrid tiled streaming according to an embodiment of the invention. In particular, FIG. 1 depicts a system for hybrid tiled streaming 100 comprising one or more media sources 102,104, e.g. one or more video servers configured for storing video data 106,108 on the basis of a predetermined data format and for streaming the video data using a suitable streaming or transport protocol to media devices $118_{1-3}$. In an embodiment, a media source may be part of a content delivery network (CDN) that is configured for efficient delivery of media data to a large number of media devices.

A media device may generally relate to a content processing device, e.g. a (mobile) content play-out device such as an electronic tablet, a smart-phone, a notebook, a media player, a television, etc. In some embodiment, a media device may be a set-top box or content storage device configured for processing and temporarily storing content for future consumption by a media play-out device.

Each of the media devices may comprise a client device $120_{1-3}$ (e.g. a DASH client) configured for requesting media data from one or more network nodes, e.g. video servers, for receiving requested media data and for buffering the media data for input to a media engine $122_{1-3}$. The media engine may be configured to decode the media data into video frames.

In an embodiment, at least a first media source 106 may be configured to store one or more base streams 106, e.g. conventional audio-video (AV) streams, which may be transmitted to the client device on the basis of a suitable media streaming or transport protocol. The base stream may be transmitted to the client device on the basis of a broadcast, multicast or unicast scheme and an associated data transport/streaming protocol including but are not limited to RTP, HTTP progressive download, HTTP adaptive streaming, (HEVC) tiled streaming etc.

For example, in an embodiment, the base stream may be stored in an MPEG format such as the MPEG-2 TS format and broadcast in one or more broadcast streams, e.g. DVB streams, over terrestrial (DVB-T), cable (DVB-C) or satellite (DVB-S) to multiple media devices. The enhancement tile streams may be provided to the media device using a unicast connection, e.g. a broadband (Internet) connection. In order to enable time synchronisation between the broadcast and the enhancement tile streams, common timeline information may be inserted in the base stream and enhancement tile streams. For example, in an embodiment, the timeline and external media information (TEMI) features in an MPEG-2 transport stream may be used by the broadcaster to insert a common timeline in the MPEG-2 TS formatted base and enhancement tile streams. In a further embodiment, an URL may be inserted in the MPEG-2 TS stream enabling a client device to request one or more MPDs associated with the enhancement tile streams.

Further, in order to enable spatial synchronisation, spatial information (e.g. coordinates) associated with the one of the one or more ROIs in the video frames of the base stream may be signalled to a client device in the MPEG-2 TS base stream. Particular advantageous embodiments of such spatial synchronization are described in WO2015014773 which is hereby incorporated by reference into this disclosure. In a further embodiment, the base video stream may be delivered via one or more RTP streams via multicast to e.g. a plurality of IPTV subscribers. Additionally, the enhancement tile streams may be provided via unicast using a suitable data format such as the DASH (Dynamic Adaptive Streaming over HTTP) format or RTP.

A base stream may be associated with one or more enhancement tile streams 108, which may be stored on the same network node as the base stream or, alternatively, on at least a second media source 102, e.g. a second video server. In an embodiment, media data of the base stream and the enhancement tile streams may be generated on the basis of one original video source, wherein media data of an enhancement tile stream are configured to enhance the visual content of one or more subregions (one or more ROIs) in the image regions of video frames of a base stream. For example, the base stream may be generated by encoding a raw video stream into a conventional HD video stream and the enhancement tile streams may be generated by encoding the same raw video stream into an HEVC tiled video stream comprising tiled video frames, i.e. video frames comprising one or more tiles, wherein the (perceived) quality of the HEVC encoded tile streams that can be requested is higher than the (perceived) quality of the base stream, and whereby each HEVC encoded tile stream comprises a different subset of the tiles present in the HEVC tiled video stream. The base and the associated enhancement tile streams (in the above case the HEVC encoded tile streams) may form a media composition of a particular video content.

It is submitted that enhancement of visual content of one or more subregions in video frames of a base stream is not limited to locally increasing the subjective video quality in a ROI such as enhancing the (parts of the) colour information per pixels or to locally increasing the pixel resolution in a ROI, but also encompasses blurring or hiding ROIs (e.g. faces of persons for privacy reasons), substituting an object or objects identified in a ROI (e.g. substituting persons by a cartoon), locally inserting or substituting visual information (e.g. inserting advertisements), locally inserting error recovery information and/or watermark information in one or more ROIs, etc. Hence, in this application the concept of local video enhancement in the video frames of a base stream using hybrid tiled streaming scheme (hybrid in the sense that video rendering on the basis of a conventional media stream is combined with video rendering on the basis of HEVC tile stream) should be construed as any type of local enrichment or purposeful modification of video data in one or more ROIs of video frames of a base stream on the basis of enhancement tile streams.

Further, it is submitted that the media data of both the base stream and the enhancement tile streams are formatted as independently consumable media streams. Hence, media data of these streams can be independently retrieved and rendered. These streams thus technically differ from the SVC or SHVC base layer and enhancement layers in the sense that a SVC or SHVC enhancement layers can only be used for play out by combining media data of the base layer and the data from the enhancement layers. Unlike the invention as claimed, and by definition these prior art enhancement layers cannot be used for play out in the absence of the base layer.

Media data associated with a tile in tiled video frames of an enhancement tile stream are encoded such that they have no spatial decoding dependency on the media data of other tiles of the same video frame and such that they have no temporal decoding dependency on the media data of other tiles of earlier or future video frames. Through these encoding constraints, media data associated with each tile may be stored as tile tracks on the second media source 104. The media data in the tile tracks are configured such that random access is accomplished, i.e. media data of different tiles may be individually accessed and requested by a client device and media data of thus requested tiles may be transmitted as one or more enhancement tile streams to a client device.

The client device (as part of the media device) may be configured to select a set of enhancement tile streams associated with one or more ROIs in the image region of the base stream. In an embodiment, the client device may perform this selection on the basis of information in a so-called manifest file 110, i.e. one or more data structures comprising metadata for the client device in order to select and request media streams, in this particular case base streams and one or more enhancement tile streams for enhancing one or more parts, one or more ROIs, in the video frames of the base stream, from one or more storage nodes (e.g. servers), preferably a storage node in a network.

A manifest file may comprise stream identifiers, e.g. URLs, or information for determining such stream identifiers. The stream identifiers may include one or more base stream identifiers and one or more enhancement tile stream identifiers. The manifest file may further comprise information about the spatial relationship between visual content in the video frames of the basis stream and the visual content in the tiled video frames of enhancement tile streams. In an embodiment, a tile stream identifier may be associated with tile position information, i.e. information for signaling a client device about the position (e.g. the coordinates) of a tile of a tiled video frame of a tile stream. Such position would thus also relate to a position of the subregion the tile represents within an image region of video frames of a base stream that is associated with the enhancement tile stream.

A manifest file may further comprise location information of one or more storages nodes, e.g. one or more URLs and/or network addresses of network nodes. These network nodes may relate to media sources 102,104 and/or media caches 116 that are configured to transmit requested media data to a client device. A client device may use a manifest file to select a base stream and one or more enhancement tile streams associated with one or more ROIs in the image region of the video frames of the base stream.

A client device $120_{1-3}$ in a media device $118_{1-3}$ may receive and buffer the media data of the base stream and the one or more enhancement tile streams and prepare the media data as one or more bitstreams for input to a media engine $122_{1-3}$, preferably by stripping the metadata (e.g. a header) associated with the transport protocol (e.g. HTTP or RTP) used for retrieving the streams. The media engine may comprise at least two decoders, a first decoder for decoding media data of the base stream into base video frames and a second decoder for decoding media data of enhancement tile streams into tiled video frames. The visual content of the tiles in the tiled video frame may represent one or more subregions in the image region of the tiled video frames (and these subregions may have associated subregions in the image region of video frames of the associated base stream). Then, the generated video frames are forwarded to a rendering engine $124_{1-3}$ that is coupled to the media engine. The rendering engine may comprise frames buffers for buffering the video frames and a fusion processor (not shown) for fusing video frames of the base stream and the tiled video frames associated with the enhancement tile streams into a single video frame 126 comprising one or more enhanced ROIs 128.

Hence, the invention leverages the tile feature defined in advanced video coding standards such as the HEVC video-coding standard. The tile feature of such codecs allow encoding of high quality video data in a tiled video stream wherein the media data of the tiled video stream may be stored as individual tile tracks such that media data associated with one or more tiles can be individually accessed and streamed as one or more enhancement tile streams to a media device. The media data of multiple enhancement tile streams can be efficiently decoded by a single decoder into tiled video frames comprising enhanced visual content (e.g. high quality visual content) encompassing one or more ROIs in the image region of the video frames. These tiled video frames comprising enhanced visual content at the position of the one or more ROIs may be combined with the video frames of a standard base stream resulting into video frames comprising enhanced ROIs. A tiling scheme composed of many small tiles enables accurate selection of a set of tiles that cover a ROI (for example the current edition of the HEVC standard permits in the highest HEVC bit stream level to use a grid of up to 22×20 tiles). However obviously this number may change increase in future editions of the HEVC standard.

The invention thus enables a fully personalised enhancement function by determining the positions and sizes of one or more ROI's in a base stream (e.g. a standard quality video stream) and subsequently requesting desired enhancement tiles (e.g. of a high quality tiled video stream) associated with (e.g. covering) one or more ROIs. Thereafter, the client device may replace or blend, at least in part, the media data in the ROIs of the video frames of the base stream with the media data of the enhancement tile streams thus generating one or more enhanced areas (e.g. one or more ROIs of enhanced video quality) in the video frames of the base stream.

The invention may be used in different use cases. For example, in Virtual Reality (VR) applications a user may have the freedom to navigate in 360 degrees videos wherein video content is constantly displayed in front of the eyes of the user. However, it is well known that peripheral human vision is not sensitive to high frequencies (fine details). Hence, the hybrid tiled streaming scheme in this disclosure may be used to only enhance the region that the viewer is looking at while the rest of the displayed content is provided in a standard quality thus saving bandwidth.

Figure 2:
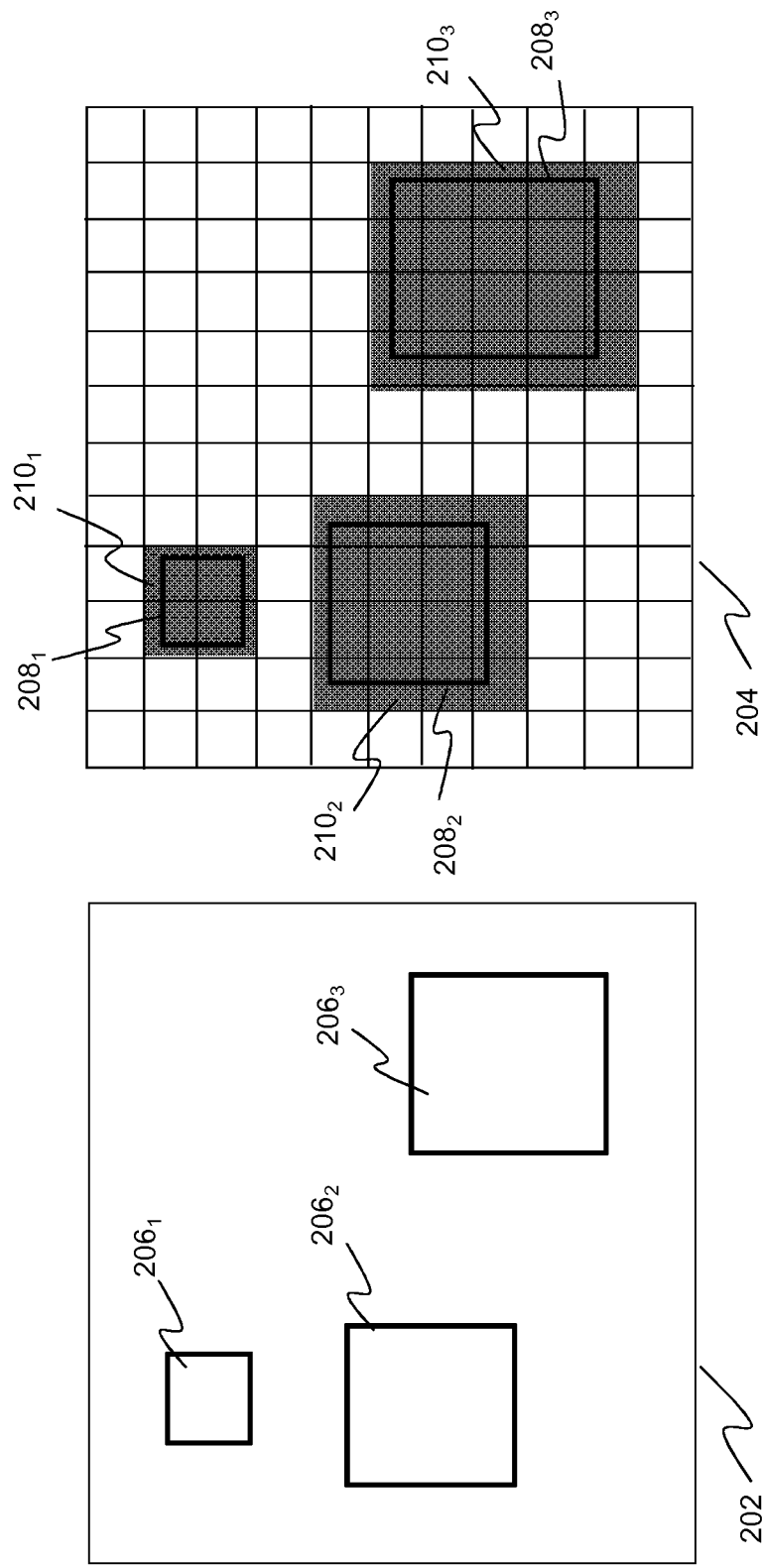
FIG. 2 schematically depicts the selection of tiles of a tiled HEVC enhancement tile stream on the basis of one or more ROIs in the base stream.

FIG. 2 schematically depicts the selection of enhancement tile streams on the basis of one or more ROIs in the base stream according to an embodiment of the invention. During rendering of a base stream one or more ROIs $206_{1-3}$ in the video frames of the base stream may be selected for enhancement, in particular quality enhancement. In an embodiment, an application executed on the media device may enable selection of a ROI may on the basis of a user interacting with a user interface, e.g. a touch screen, of the media device. Alternatively, a ROI in the video frames of a base stream may be identified on the basis of an image recognition process using e.g. well-known feature analysis techniques. The image recognition process may be part of an application running on the media device. The coordinates of the thus determined ROIs are then used to select and request one or more enhancement tile streams. Although the ROIs in the figures are depicted as simple rectangular boxes it is submitted that a ROI can have any arbitrary shape. For example, a ROI may closely follow the shape of an object in a video frame that is recognized and tracked using an image recognition process.

The base stream may be associated with a tiled video stream 204, preferably a HEVC encoded tiled video stream, that is of a higher video quality than the base stream. The tiled video stream may comprise tiled video frames and media data associated with a tile in the tiled video frames can be requested by the client device using e.g. information in a manifest file. As shown in FIG. 2 a tile or a group of tiles may be selected on the basis of the selected ROIs $208_{1-3}$. For example, in an embodiment, tiles that have overlap with a ROI may be identified as a tile or a group of tiles $210_{1-3}$ associated with a ROI. The media data associated with the thus identified tiles may be requested by the client device as one or more enhancement tile streams. A network node receiving a request for transmission of an enhancement tile stream from the client device may transmit the media data as a tile stream, preferably an HEVC-based tile stream, to the client device.

The image region of the video frames of base stream may correspond to the image region of the tiled video frames of the tiled video stream. A tile thus corresponds to a subregion of the image region.

In a further embodiment, instead of the client device determining the enhancement tile streams on the basis of ROI coordinates, the ROI coordinates may be sent to the server in a message, for example, as a media fragment in the URL: http://servercom/video.mp4#xywh=0,0,200,100. An server application may then use the coordinates in order to select the matching tiles for transmission to one or more client devices.

Figure 3:
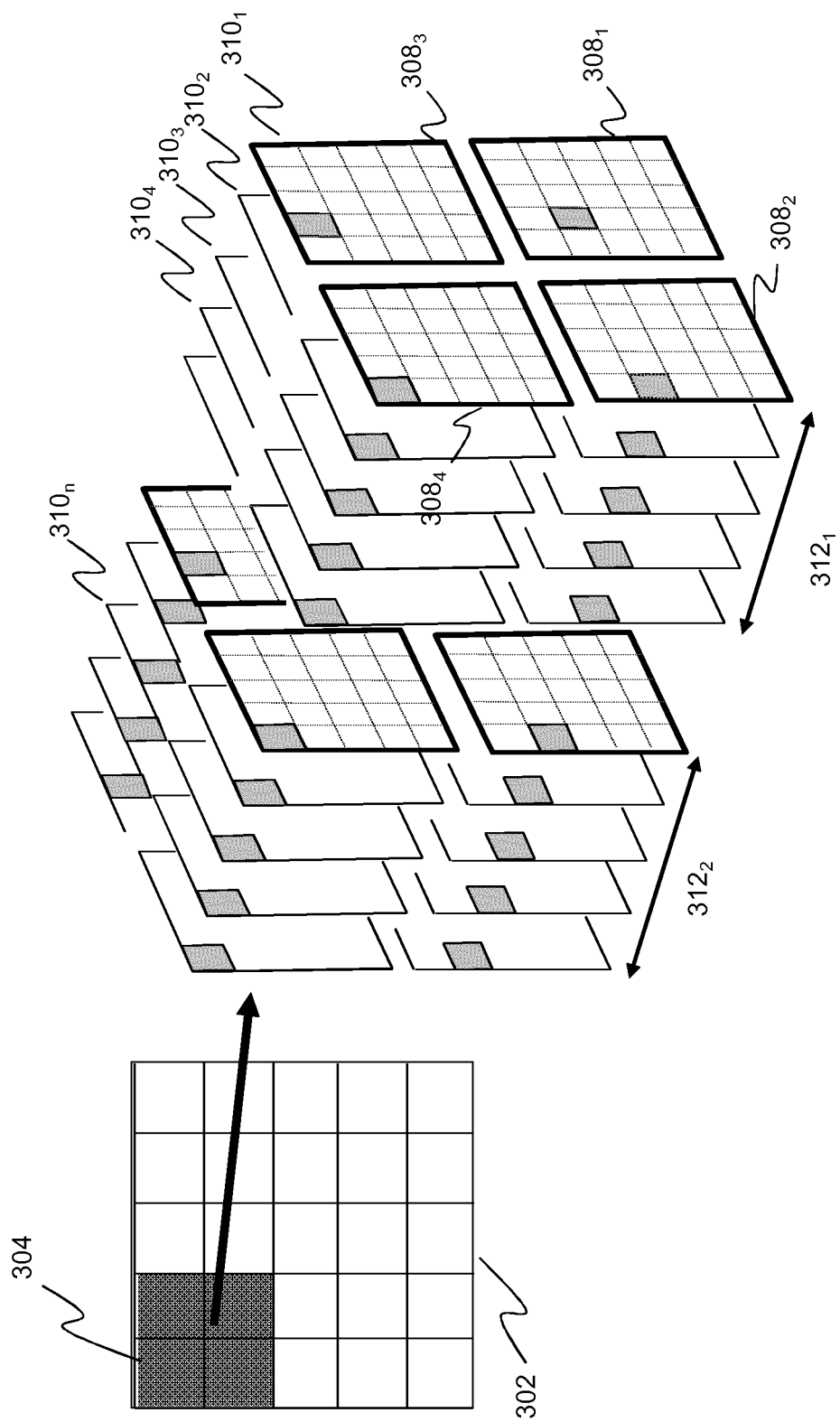
FIG. 3 schematically depicts tile streams selected on the basis of a ROI.
Figure 4:
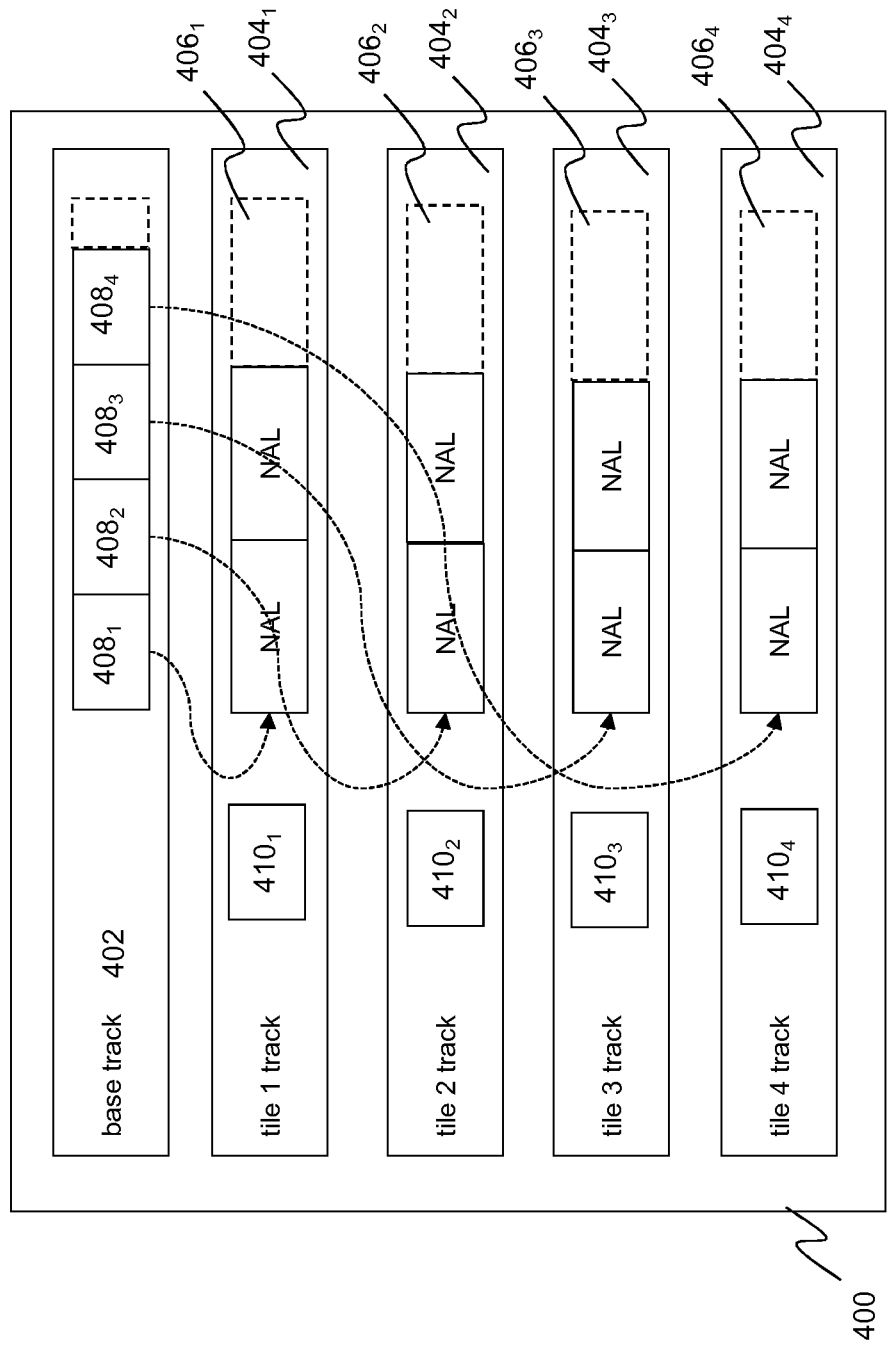
FIG. 4 schematically depicts a media format for storing tile streams of a tiled HEVC enhancement tile stream.

FIGS. 3 and 4 schematically depict the concept of spatially random accessible enhancement tile streams according to an embodiment of the invention. In particular, FIG. 3 depicts video frames, preferably HEVC tiled video frames, comprising tiles 304 arranged in accordance with a spatial grid 302. Media data associated with each tile of a video frame may be stored and formatted such that the encoded media data can be transmitted as an independent stream to the client device. For example, in FIG. 3 the media data of the four selected tiles 304 may be transmitted as four separate tile streams $308_{1-4}$ to the client device.

The media data associated with a tile are encoded such that they do not have any spatial decoding dependency on the media data of other tiles $308_{2-4}$ of the same video frame. Further, the media data associated with a tile are encoded such that they do not have any temporal decoding dependency on the media data of other tiles $308_{2-4}$ of earlier or future video frames. Hence, in this disclosure the term "independently decodable" media data means that there is no spatial (de)coding dependency between media data associated with a tile in a video frame of a enhancement tile stream, and media data outside the tile (e.g. in the neighboring tiles associated with other enhancement tile streams) and no temporal (de)coding dependency between media data of tiles at different positions in different video frames, and associated with different enhancement tile streams. The term is further used in expressions to explicitly indicate that media data of an enhancement tile stream (e.g. comprising one or more tiles) are also independently decodable from the media data of a base stream.

As shown in FIG. 3, each tiled video frame $310_{1-n}$ of a (decoded) tile stream only comprises visual content $306_1$ at a particular tile position within a reference frame, e.g. the full image region of a tiled video frame. Preferably, a tile stream comprises encoded media data associated with exactly one tile at a predetermined tile position. In an embodiment, a tile stream may comprise metadata or may be associated with metadata for signaling the media device that the media data are associated with visual content at a particular tile position within the video frames.

This way, media data associated with a predetermined tile in subsequent tiled video frames may be independently decoded by a decoder module in a media device (e.g. in the media engine of the media device). In other words, the media device may receive media data of one tile $308_1$ and start decoding, from the earliest random access point received, the media data into video frames without the need of media data of other tiles. Here, a random access point may be associated with a video frame that does not have any temporal decoding dependencies on earlier and/or later video frames, e.g. an I-frame or an equivalent thereof. This way, media data associated with one individual tile may be transmitted as a single independent tile stream to the client device.

Different transport protocols may be used to transmit an encoded bitstream to a client device. For example, in an embodiment, an HTTP adaptive streaming (HAS) protocol (such as MPEG DASH) may be used for delivering a tile stream to a client device (also referred to as a client). In that case, the sequence of video frames in the tile stream may be divided in temporal segments $312_{1,2}$ typically comprising 2-10 seconds media data. Such temporal segment may be stored as a media file on a storage medium. In an embodiment, a temporal segment may start with media data that have no temporal coding dependencies on other frames in the temporal segment or other temporal segments, e.g. an I frame or an equivalent thereof, so that the decoder can directly start decoding media data in the HAS segment. Optionally, an initialisation segment may be provided along with the media segments with the sole purpose of initialising the decoder with parameters pertaining the media stream, e.g. spatial resolution, frame rate, codec profile and level, etc. . . . .

The concept of tiles as described in this disclosure may be supported by different video codecs. For example the High Efficiency Video Coding (HEVC) standard allows the use of independently decodable tiles (HEVC tiles). HEVC tiles may be created by an encoder that divides each video frame of a media stream into a number of rows and columns ("a grid of tiles") defining tiles of a predefined width and height expressed in units of coding tree blocks (CTB). An HEVC bitstream may comprise decoder information for signaling a decoder how the video frames should be divided in tiles. The decoder information may signal the decoder on the tile division of the video frames in different ways. In one variant, the decoder information may comprise information on a uniform grid of n by m tiles, wherein the size of the tiles in the grid can be deduced on the basis of the width of the frames and the CTB size. Because of rounding inaccuracies, not all tiles may have the exact same size. In another variant, the decoder information may comprise explicit information on the widths and heights of the tiles (e.g. in terms of coding tree block units). This way video frames may be divided in tiles of different size. Only for the tiles of the last row and the last column the size may be derived from the remaining number of CTBs. Thereafter, a packetizer may packetize the raw HEVC bitstream into a suitable media container that is used by a transport protocol.

Other video codecs that support independently decodable tiles include the video codec VP9 of Google or—to some extent—the MPEG-4 Part 10 AVC/H.264, the Advanced Video Coding (AVC) standard. In VP9 coding dependencies are broken along vertical tile boundaries, which means that two tiles in the same tile row may be decoded at the same time. Similarly, in the AVC encoding, slices may be used to divide each frame in multiple rows, wherein each of these rows define a tile in the sense that the media data is independently decodable. Hence, in this disclosure the term "tile" is not limited to HEVC tiles but generally defines a subregion of arbitrary shape and/or dimensions within the image region of video frames, wherein the media data within the boundaries of the tile are independently decodable, e.g. not dependent on a base stream or on other tiles. In other video codecs other terms such as segment or slice may be used for such independently decodable regions.

FIG. 4 depicts a media format for storing a set of enhancement tile streams as a video file on a storage medium according to an embodiment of the invention. In particular, FIG. 4 depicts an HEVC media format for storing media data of enhancement tile streams, which enhancement tile streams may be generated on the basis of a tiled video stream comprising tiled video frames. The media data associated with individual tiles may be segmented and stored in a media file that has a media format that allows spatial random access to media data of individual tile streams. In an embodiment, the media format may be an HEVC file format 400 as defined in ISO/IEC 14496-15 or an equivalent thereof. The media format depicted in FIG. 4 may be used for storing media data of tile streams as a set of "tracks" such that a client device in a media device may request transmission of only a subset of the tile streams, e.g. a single tile stream or a plurality of tile streams. The media format allows a client device to individually access a (enhancement) tile stream without the necessity to request other or even all tile streams of the tiled video. As shown in FIG. 4, the media file may comprise one or more tile tracks $404_{1-4}$, wherein each tile track serves as a container for data $406_{1-4}$, e.g. VCL units and non-VCL NAL units, of a tile stream.

In an embodiment, a track may further comprise tile information $410_{1-4}$. The tile information of a track may be stored in a tile-related box of the corresponding file format (e.g in a box according to an ISO BMFF format) or in the de-capsulated bitstream, that is the encoded bitstream without metadata of the media container anymore (e.g. the tile information is than present as metadata of the codec used, e.g. in a Non VCL NAL unit). A decoder may use the tile information in order to initialise the layout of the tile grid. In an embodiment, tile information in a track may comprise an origin and size information in order to allow the decoder to visually position a tile in a reference space, typically the space defined by the pixel coordinates of the luminance component of the video, wherein a position in the space may be determined by a coordinate system associated with the full image (i.e. the image region of a video frame). During the decoding process, the decoder module may preferably use the tile information from the encoded bitstream in order to decode the bitstream. In an embodiment, a track may further comprise a track index. The track index provides a track identification number that may be used for identifying media data associated with a particular track.

The media format (e.g. the media container such as an ISO BMFF based media container (e.g. mp4 or 3GP), or a media container based on for example the webm or mpeg2 is media format) may further comprise a so-called base track 402. The base track may comprise metadata that is needed for decoding the media data in the tile tracks. For example, the base track may comprise sequence information allowing a media engine in a media device to determine the sequence (the order) of the video data (e.g. the VCL NAL units) received by a client device when requesting a particular tile enhancement stream, in which they need to be structured in order to form a decoder compliant bit stream. In particular, the base track may comprise a sequence of extractors $408_{1-4}$, wherein each extractor comprises a pointer to certain media data, e.g. NAL units, in one or more corresponding tile tracks.

An extractor may be an extractor as defined in ISO/IEC 14496-15:2014. Such extractor may be associated with one or more extractor parameters allowing a media engine to determine the relation between an extractor, a track and media data in a track. In ISO/IEC 14496-15:2014 reference is made to the track_ref_index, sample_offset, data_offset and data_length parameter wherein the track_ref_index parameter may be used as a track reference for finding the track from which media data need to be extracted, the sample_offset parameter may provide the relative index of the media data in the track that is used as the source of information, the data_offset parameter provide offset of the first byte within the reference media data to copy (if the extraction starts with the first byte of data in that sample, the offset takes the value 0. The offset signals the beginning of a NAL unit length field) and the data_length parameter provides the number of bytes to copy (if this field takes the value 0, then the entire single referenced NAL unit is copied (i.e. the length to copy is taken from the length field referenced by the data offset)).

Extractors in the base track may be parsed by a media engine and used in order to identify NAL units, in particular NAL units comprising media data (audio video and/or text data) in VCL NAL units of a tile track to which it refers. Hence, a sequence of extractors allows the media engine in the media device to identify and order NAL units as defined by the sequence of extractors and to generate (or in other words prepare) a decoder compliant bitstream that is offered to the input of a decoder.

Hence, media data associated with an enhanced ROI may be retrieved by requesting media data from one or more tile tracks (each tile track comprising media data associated with a particular tile position) and by requesting the metadata of a base track as referenced by a manifest file. The client device may buffer the media data and order the NAL units of the tile streams on the basis of the sequence information, in particular the extractors, of the base track so that a bitstream suitable for the decoder module (preferably part of a media engine inside the media device) is formed. Not all tile positions in the decoded tiled video frames of need to contain visual content. If media data associated with a particular tile position in tiled video frames is not contained in the bitstream received by the media engine from the client device, the media engine may simply ignore the extractor corresponding to that tile position.

For example in the example of FIG. 3, when a client device selects four tile streams (e.g. four enhancement tile streams) for forming an enhancement ROI, it may request the base track of the enhancement tile streams and the four tracks containing the four tile streams. The media engine may use the extractors in the base track that refer to the media data of the selected tile tracks in order to form a bitstream for the decoder module. The absence of media data for all other positions may be interpreted by the decoder module as "missing data". Since the media data in the tracks (each track comprising media data of one tile stream) are independently decodable, the absence of media data of one or more tiles does not prevent the decoder module from decoding media data of tracks that can be retrieved.

Figure 5:
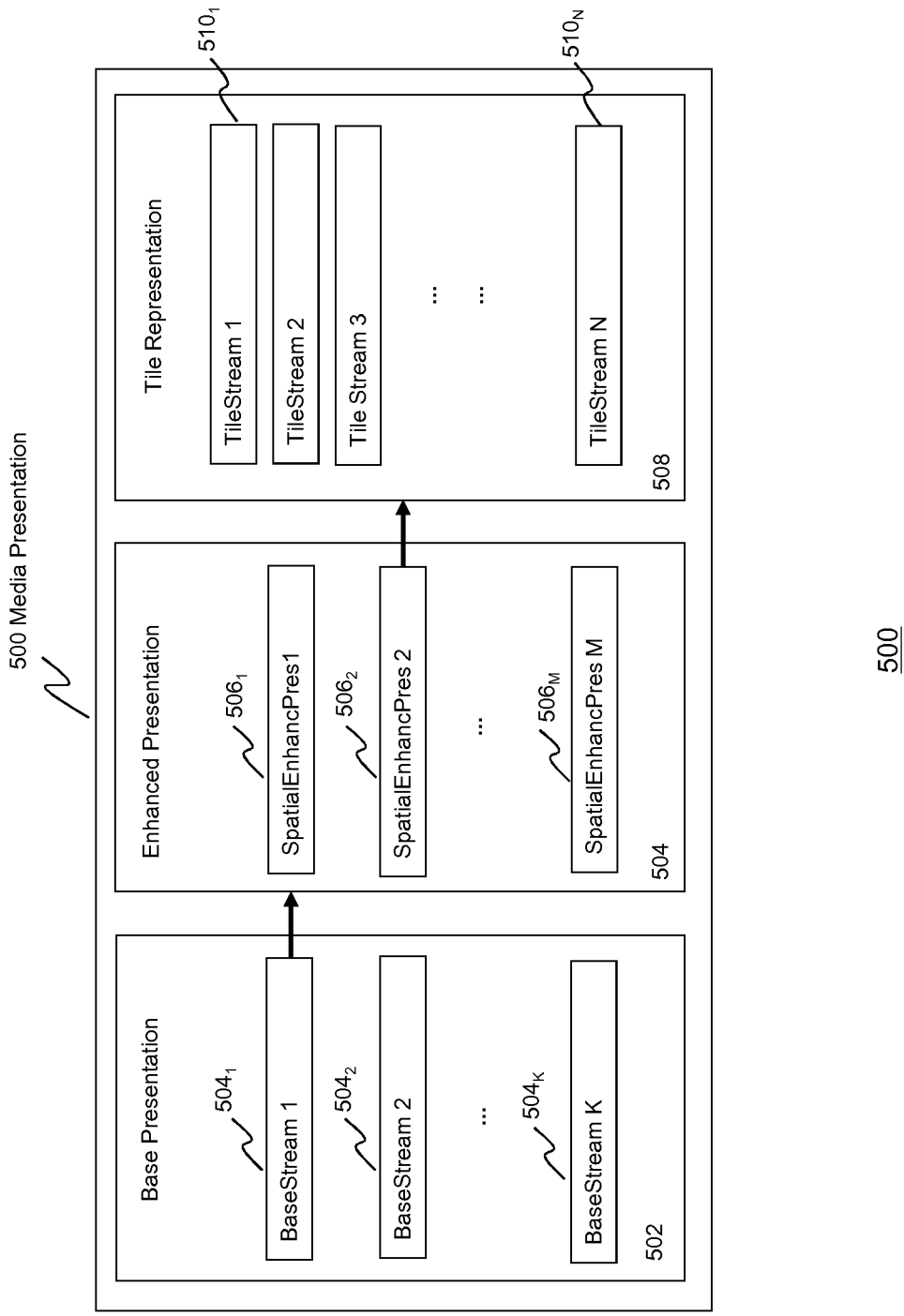
FIG. 5 schematically depicts a media presentation format for a hybrid tiled streaming scheme according to an embodiment of the invention.

FIG. 5 schematically depicts a media presentation format for a hybrid tiled streaming scheme according to an embodiment of the invention. The media presentation format 500 may define a base presentation 502, one or more base video streams $504_{1-K}$, associated with a particular content wherein the base streams may be (regular) video streams, e.g. AVC video stream, and/or tiled video streams. The one or more base streams may be associated with one or more enhanced presentations $506_{1-M}$. Each enhanced presentation may define a set of (HEVC) enhancement tile streams $510_{1-N}$ as described in detail with reference to FIG. 1-4. The enhancement tile streams can be used in combination with an associated base stream in order to create one or more enhanced ROIs in video frames of the base stream. Different enhanced presentations may define different sets of (HEVC) enhancement tile streams wherein tile streams in a set of HEVC tile streams may be individually accessed and streamed to a client. Each set of enhancement tile streams may be associated with a certain tile size and media data for enhancing the visual content in an ROI of the video frames of the base stream.

The media presentation format of FIG. 5 may be implemented as a metadata file that allows easy access and handling of the enhancement service. For example, in an embodiment, the metadata file may be implemented as a HAS manifest file, e.g. a DASH MPD as defined in ISO/IEC 23009-1, defining a plurality of adaptation sets elements each adaptation set defining a representation of video content, e.g. a base stream or a set of (HEVC) enhancement tile streams providing the same enhancement for different tiles. Examples of such MPDs are discussed below.

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
    [ . . . ]>
    <Period>
<!--Base stream : 1 video -->
    <AdaptationSet [ . . . ]>
        <SupplementalProperty schemeIdUri="urn:mpeg:dash:srd:2014" value="1, 0, 0, 1920, 1080,
1920, 1080, 1"/>
        <Representation id="base-stream" width="1920" height="1080" codecs="hev1.1.6.L93.90"
bandwidth="512000">
            <BaseURL>base-stream.mp4</BaseURL>
            <SegmentBase indexRange="7632"/>
        </Representation>
    </AdaptationSet>
<!--Enhancement tile stream -->
    <AdaptationSet [ . . . ]>
        <EssentialProperty schemeIdUri="urn:mpeg:dash:srd:2014" value="1, 0, 0, 0, 0, 0, 0, 2"/>
        <Representation id="enhancement-base" width="0" height="0" codecs="hvt1.1.2.H93.B0"
bandwidth="500">
            <BaseURL>enhancement-base.mp4</BaseURL>
        </Representation>
    </AdaptationSet>
    <AdaptationSet [ . . . ]>
        <SupplementalProperty schemeIdUri="urn:mpeg:dash:srd:2014" value="1, 0, 0, 1920, 1080,
3840, 2160, 2"/>
        <Representation id="enhancement-tile1" width="1920" height="1080"
codecs="hvt1.1.2.H93.B0" bandwidth="512000" dependencyId="enhancement-base">
            <BaseURL>enhancement-tile1.mp4</BaseURL>
            <SegmentBase indexRange="7632"/>
        </Representation>
    </AdaptationSet>
    <AdaptationSet [ . . . ]>
        <SupplementalProperty schemeIdUri="urn:mpeg:dash:srd:2014" value="1, 1920, 0, 1920, 1080,
3840, 2160, 2"/>
        <Representation id="enhancement-tile2" width="1920" height="1080"
```

```
codecs="hvt1.1.2.H93.B0" bandwidth="512000" dependencyId="enhancement-base">
      <BaseURL>enhancement-tile2.mp4</BaseURL>
      <SegmentBase indexRange="7632"/>
    </Representation>
  </AdaptationSet>
<AdaptationSet [ . . . ]>
    <SupplementalProperty schemeIdUri="urn:mpeg:dash:srd:2014" value="1, 0, 1080, 1920, 1080,
3840, 2160, 2"/>
    <Representation id="enhancement-tile3" width="1920" height="1080"
codecs="hvt1.1.2.H93.B0" bandwidth="512000" dependencyId="enhancement-base">
      <BaseURL>enhancement-tile3.mp4</BaseURL>
      <SegmentBase indexRange="7632"/>
    </Representation>
  </AdaptationSet>
<AdaptationSet [ . . . ]>
    <SupplementalProperty schemeIdUri="urn:mpeg:dash:srd:2014" value="1, 1920, 1080, 1920,
1080, 3840, 2160, 2"/>
    <Representation id="enhancement-tile4" width="1920" height="1080"
codecs="hvt1.1.2.H93.B0" bandwidth="512000" dependencyId="enhancement-base">
      <BaseURL>enhancement-tile4.nip4</BaseURL>
      <SegmentBase indexRange="7632"/>
    </Representation>
  </AdaptationSet>
</Period>
</MPD>
```

A client device may parse an MPD and use the parameters in the representation elements in order to determine the base streams and the enhancement tile streams, to determine the spatial relation between the base stream and the tile streams. The parameters in the representation elements may also be used in order to determine the type of enhancement that can be achieved, e.g. a pixel resolution enhancement or a video quality enhancement.

The codecs attribute may be used to distinguish between a base stream and (HEVC) enhancement tile streams. For example, the base stream representation (codecs="hev1.1.6.L93.90") may signal the client device that the bitstream defined by this representation is a conventional HEVC encoded bitstream defining non-tiled video frames. The codecs attribute of the four enhancement tile stream representations (codecs="hvt1.1.2.H93.130") may signal the client device that the bitstream defined by these representations are HEVC encoded bitstreams defining tiled video frames. Further, it may signal the client device that the media data may be independently decodable and stored in separate HEVC tile tracks as described with reference to FIG. 4.

The base stream and the enhancement tile streams have a certain spatial relationship between each other which may be used by the client device in order to select enhancement tile streams associated with one or more ROI's. For example, it may use the information on the spatial relationship for use in a GUI that allows a user or an application executed on the media device to select tiles on the basis of the spatial position of the tiles as defined in the MPD.

The tile position associated with an enhancement tile stream may be signalled to the client device using one or more spatial relationship descriptors (SRDs). An SRD may be used in the EssentialProperty attribute (which according to the MPEG DASH standard is information that is required to be understood by the client device when processing a descriptor) or a SupplementalProperty attribute (information that may be discarded by a client device that does not know the descriptor when processing it) in order to inform the client device that a certain spatial relationship exists between the different video elements defined in the manifest file. In an embodiment, the spatial relationship descriptor with schemeIdUri "urn:mpeg:dash:srd:2014" may be used as a data structure for formatting the tile position information.

An SRD may comprise a source_id parameter for signaling the client device which video elements in the MPD have a spatial relationship with each other. In the example, the first parameter of the SRD represents a source_id. Adaptation sets that have the same source_id (in the example the value "1") form a set of streams that have a predetermined spatial relationship. The source_id parameter may be followed by a set parameters x,y,w,h,W,H that can be used for defining a tile and the position of the tile in a reference frame (the full image region of a tiled video frame). Here the parameters W and H may define a (rectangular) reference frame of a particular width (W) and height (H). The left upper corner of the reference frame may define an origin O of a coordinate system within the reference frame. The parameters x,y,w,h may be used to define a rectangular tile of width (w) and height (h) wherein the coordinates x,y represents the position of the left upper corner of the tile in the coordinate system of the reference frame. Hence, the SRD information may define the image region of a tiled video frame and a subregion comprising visual content within this image region wherein the subregion represents a tile.

As shown in the above MPD example, the base stream is associated with an SRD wherein the size and origin of the reference frame matches the size and origin of the tile thus signaling the client device that the base stream comprises video frames comprising visual content over the full image region of the video frames.

The tile position parameters x,y,w,h,W,H in the SRD of the first adaptation set of the enhancement tile streams are set to zero, thereby signaling the client device that this adaptation set does not define visual content. Instead, this adaptation set contains a so-called base track comprising metadata, in particular a sequence of extractors that refer to media data in the associated tile tracks as defined in the adaptation sets defining the enhancement tile streams.

The dependencyId parameter in the representation element of the adaptation sets of the enhancement tile streams refers to the base track, and contains as value the Representation whose id attribute is "enhancement-base" so that when selecting a tile track, a client device is signaled that it should also request the metadata of the associated base track with as id attribute "enhancement-base". When receiving media data of one or more enhancement tile streams and the associated metadata of the associated base track, a media engine may parse the extractors in the base track in order to order the VCL NAL units of the requested tile streams (as defined in the tracks) and to concatenate the payload of the ordered NAL units into a bitstream (such as a HEVC compliant bitstream) comprising all the metadata that a decoder module needs for decoding the bitstream into video frames that may be rendered on one or more display devices. The above-described SRD information in the MPD thus offers a content author the ability to describe a certain spatial relationship between the base stream and the one or more enhancement tile streams.

The representation element further comprises the width and height attributes for signaling the media device the pixel resolution of a video frame. A client device may use the SRD information and the information on the pixel resolution associated with the base and enhancement tile streams, to determine the spatial relation between the video frames of the base stream and the tile streams.

For example, in the MPD example above, the MPD signals the client device that the base stream comprises video frames of 1920×1080 pixels and that the tile streams define tiled video frames comprising a 1920×1080 pixel tile in a 3840×2160 reference frame. As will be described hereunder in more detail, in order to fuse the tiled video frames of an enhancement tile stream (e.g. the left top enhancement tile stream) with corresponding video frames of the base stream, the video frames of the base stream may need to be modified after decoding (e.g. the video or picture characteristics of the enhancement tile stream need to be up-scaled) to the format of the tiled video frames of the enhancement tile stream (e.g. to match the video or picture characteristics of the enhancement tile stream).

As already described before different enhancement schemes may be used. For example, in an embodiment, the signal-to-noise (SNR) in a ROI may be enhanced by increasing the bitrate. The signal-to-noise ratio is a metric which measures the objective quality of a lossy encoded video compared to the original source. Here the goal is to enhance the perceived quality by requesting a part of the whole video in a higher bitrate but with the same pixel resolution.

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
    [ ... ]>
    <Period>
<!--Base stream : 1 video of 4K resolution-->
<AdaptationSet [ ... ]>
        <SupplementalProperty schemeIdUri="urn:mpeg:dash:srd:2014" value="1, 0, 0, 3840, 2160, 3840, 2160, 1"/>
        <Representation id="base-stream" width="3840" height="2160" codecs="hev1.1.6.L93.90" bandwidth="512000"
            <BaseURL>base-stream.mp4</BaseURL>
            <SegmentBase indexRange="7632"/>
        </Representation>
    </AdaptationSet>
<!--4 enhancement tile streams of each Full HD resolution which composes a 4K panorama -->
    <AdaptationSet [ ... ]>
        <EssentialProperty schemeIdUri="urn:mpeg:dash:srd:2014" value="1, 0, 0, 0, 0, 0, 0, 2"/>
        <Representation id="mosaic1-base" width="0" height="0" codecs="hvt1.1.2.H93.B0" bandwidth="500">
            <BaseURL>enhancement-base.mp4</BaseURL>
        </Representation>
    </AdaptationSet>
<AdaptationSet [ ... ]>
        <SupplementalProperty schemeIdUri="urn:mpeg:dash:srd:2014" value="1, 0, 0, 1920, 1080, 3840, 2160, 2"/>
        <Representation id="enhancement-tile1" width="1920" height="1080" codecs="hvt1.1.2.H93.B0" bandwidth="512000" dependencyId="enhancement-base">
            <BaseURL>enhancement-tile1.mp4</BaseURL>
            <SegmentBase indexRange="7632"/>
        </Representation>
    </AdaptationSet>
<AdaptationSet [ ... ]>
        <SupplementalProperty schemeIdUri="urn:mpeg:dash:srd:2014" value="1, 1920, 0, 1920, 1080, 3840, 2160, 2"/>
        <Representation id="enhancement-tile2" width="1920" height="1080" codecs="hvt1.1.2.H93.B0" bandwidth="512000" dependencyId="enhancement-base">
            <BaseURL>enhancement-tile2.mp4</BaseURL>
            <SegmentBase indexRange="7632"/>
        </Representation>
    </AdaptationSet>
<AdaptationSet [ ... ]>
        <SupplementalProperty schemeIdUri="urn:mpeg:dash:srd:2014" value="1, 0, 1080, 1920, 1080, 3840, 2160, 2"/>
        <Representation id="enhancement-tile3" width="1920" height="1080" codecs="hvt1.1.2.H93.B0" bandwidth="512000" dependencyId="enhancement-base">
            <BaseURL>enhancement-tile3.mp4</BaseURL>
            <SegmentBase indexRange="7632"/>
        <Representation>
```

```xml
    <AdaptationSet>
<AdaptationSet [ ... ]>
    <SupplementalProperty schemeIdUri="urn:mpeg:dash:srd:2014" value="1, 1920, 1080, 1920,
1080, 3840, 2160, 2"/>
        <Representation id="enhancement-tile4" width="1920" height="1080" codecs="hvt1.1.2.H93.B0"
bandwidth="512000" dependencyId="enhancement-base">
        <BaseURL>enhancement-tile4.mp4</BaseURL>
        <SegmentBase indexRange="7632"/>
    <Representation>
    <AdaptationSet>
</Period>
<MPD>
```

In this example, both the enhancement tile streams and the base stream are associated with a bitrate of 512000 (as indicated by the bandwidth parameter in the MPD). However, the SRD information signaled in the supplemental property elements indicates that each of the enhanced tile streams comprise tiled video frames, having a tile size that is smaller than the size of the image region of the vide frames of the base stream (in this particular example a size of a tile is a quarter of the size of an image region of video frames of the base stream). As a result, the client device according to the invention is configured to determine on the basis of this information that each enhancement tile stream provides a higher quality (a higher SNR) for the subregion of the image region of video frames of the base stream they cover, as compared to the base stream itself, since at constant bitrate they each cover only one quarter of the base stream. In other words, more bits per pixel are being spent to encode an enhancement tile stream than to encode the base stream.

The advantage of such an enhancement, and in the absence of further enhancements, is that it does not require any upscaling, as the pixel dimensions of the decoded frames of the enhancement tile streams are the same as those of the decoded frames of the base stream.

Hence, from the above, it follows that a manifest file may comprise enhancement information, e.g. one or more enhancement parameters defining the resolution, bitrate, color depth, frame rate of the one or more enhancement tile streams and the base stream, for enabling a client device to derive the type of enhancement that can be provided. The enhancement information may also include enhancement parameters other than those mentioned above, for example, in case the enhancement is associated with a local enhancement other than quality or resolution enhancement, such as blurring or hiding ROIs (e.g. faces of persons for privacy reasons), substituting an object or objects identified in a ROI (e.g. substituting persons by a cartoon), locally inserting or substituting visual information (e.g. inserting advertisements), locally inserting error recovery information and/or watermark information in one or more ROIs, etc. Further, a manifest file may comprise tile position information for signaling the client device on the spatial relation between visual content in the video frames of the base stream and visual content in the tiles of the tiled video frames of the one or more enhancement tile streams, preferably said position information comprising one or more spatial relationship descriptors (SRDs), a spatial relationship descriptor being associated with a base stream and/or an enhancement tile streams, the spatial relationship descriptor signaling the client device about the position of the visual content in the video frames of the base stream and/or about the position of a tile in the tiled video frames of an enhancement tile stream.

Figure 6:
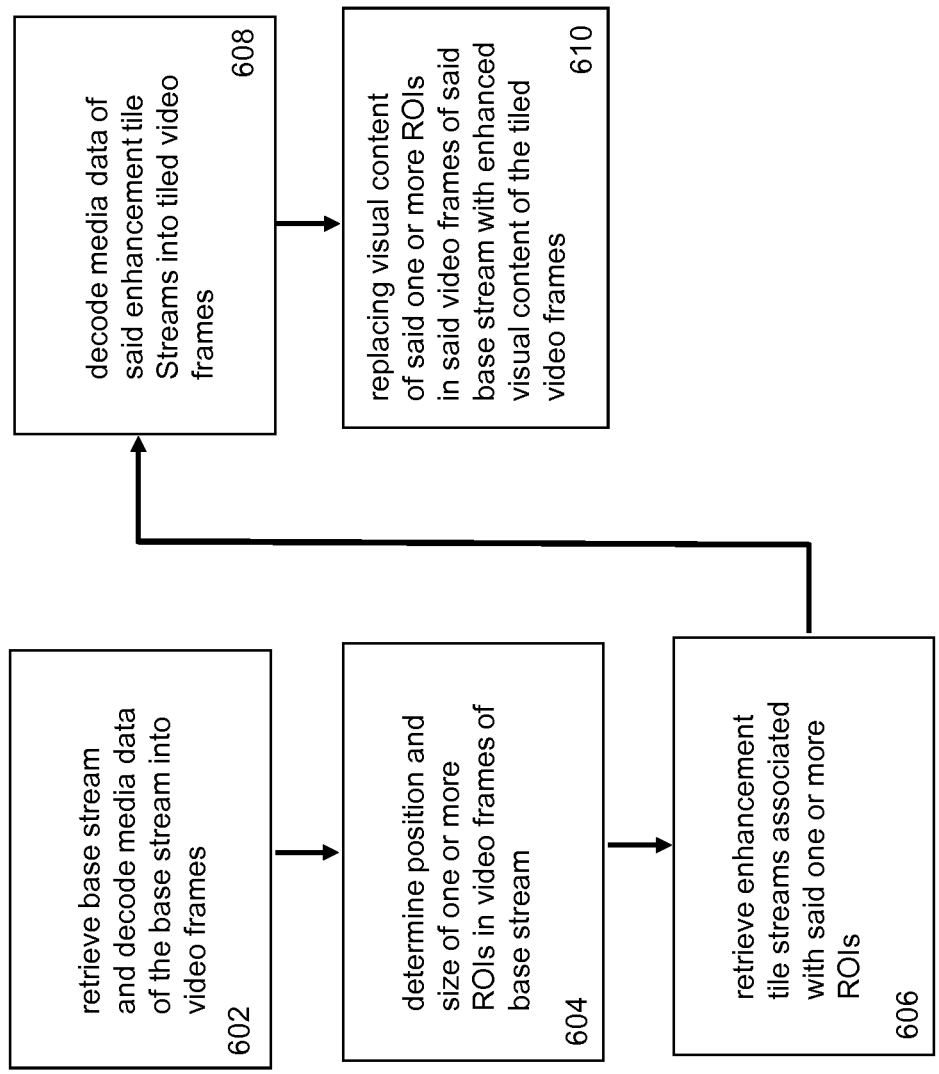
FIG. 6 schematically depicts a process for combining a base stream and one or more enhancement tile streams according to an embodiment of the invention.

FIG. 6 schematically depicts a process for combining a base stream and one or more enhancement tile streams according to an embodiment of the invention. The process may start with a first step 602 wherein a client device retrieves media data of a base stream and decodes the media data of the base stream in video frames that are rendered as a visual content on one or more displays or other suitable user interface. Thereafter, the position and size of one or more ROIs in the video frames of the base stream may be determined (step 604). The ROIs can be freely defined or selected from a predetermined set of ROI from which the application and/or the user can choose from. Thereafter, the client device may determine one or more enhancement tile streams that are associated with the ROIs and retrieve the media data associated with the thus determined one or more enhancement tiles (step 606). The media data of the received one or more (HEVC encoded) enhancement tile streams are decoded using an single HEVC decoder into tiled video frames, wherein the tiled video frames, having an image region, comprise enhanced visual content at the position (e.g. a subregion within said image region) of the selected tiles (step 608). Then, video frames of the base stream and tiled video frames associated with the enhancement tile streams are combined into video frames comprising one or more enhanced ROIs. In particular, visual content (pixels) in the one or more ROIs in the video frames of the base stream is replaced by enhanced visual content (enhanced pixels) of the tiled video frames associated with the enhancement tile streams.

Figure 7:
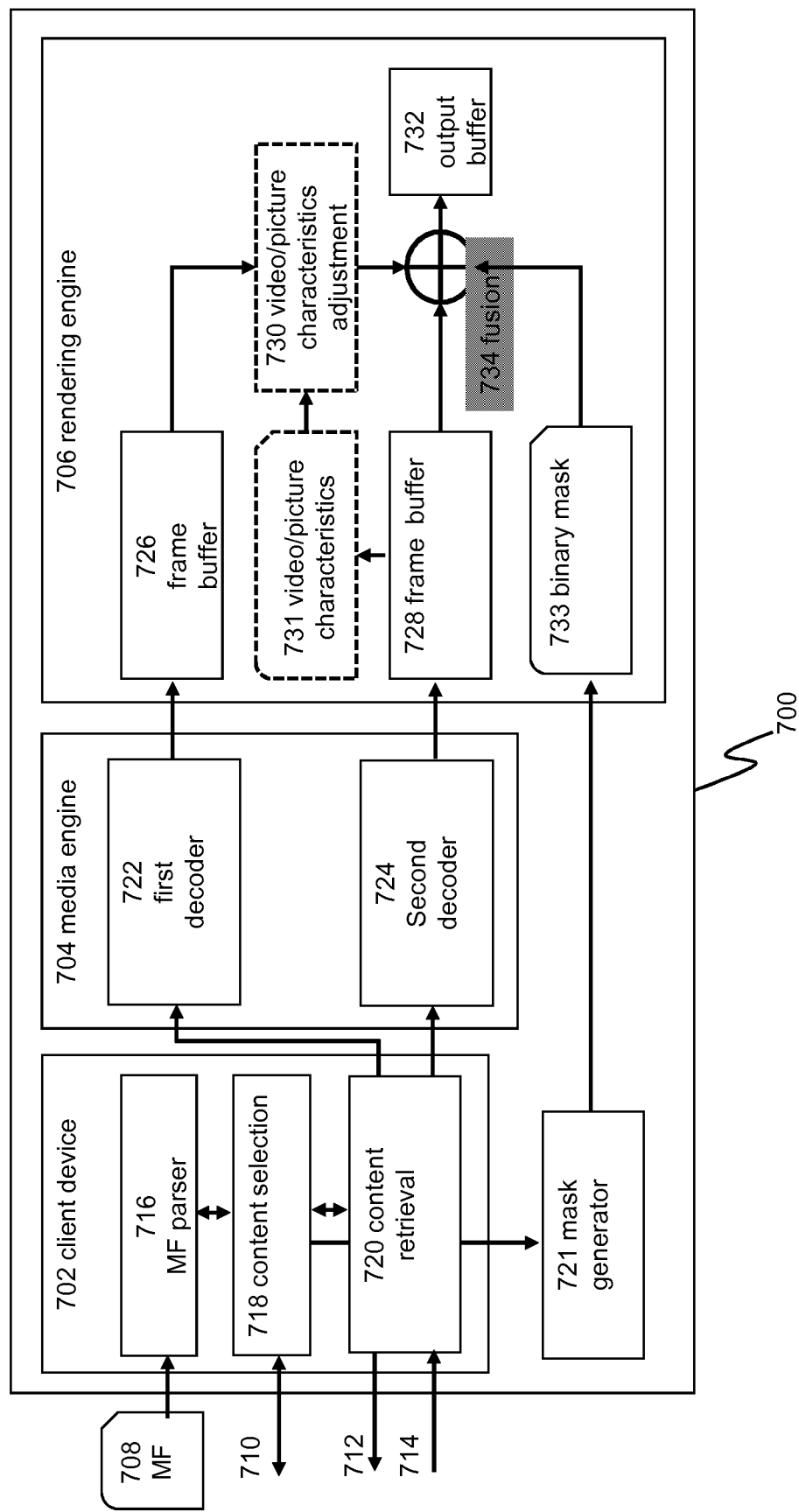
FIG. 7 schematically depicts a media device configured for combining a base stream and one or more enhancement tile streams according to another embodiment of the invention.

FIG. 7 schematically depicts a media device configured for combining a base stream and an HEVC encoded enhancement tile stream according to another embodiment of the invention. The encoding of the video for generating the base stream is a process that is conducted independently from the encoding of the video for generating the enhancement tile stream. Thus it is conceivable that the base stream may comprise media data encoded in for example AVC and the enhancement tile stream may comprise media data encoded in HEVC. Of course the media data of the base stream may also have been encoded using HEVC, albeit in an independent encoding process In particular, FIG. 7 depicts a media device 700 comprising a client device 702 for selecting and retrieving content, including one or more base stream and one or more enhancement tile streams for enhancing one or more ROI in the image region of video frames of a base stream, a media engine 704 for processing, in particular decoding, media of the base and enhancement tile streams and a rendering device 706 for processing video frames of the base stream and enhancement tile stream and for fusing the thus processed video frames into video frames comprising one or more enhanced ROI.

As shown in FIG. 7 the client device (e.g. a Dynamic Adaptive Streaming over HTTP or in other words a DASH enabled client device, also referred to as a DASH client) may be configured to receive one or more manifest files 708 and store the manifest file in a memory. A manifest file parser 716 may parse and analyse the manifest file and provide information on the base and enhancement tile streams to a content selection module 718. The content selection module may be adapted to receive information on one or more ROIs in the image region of a base stream. As already described above, the information on the one or more ROIs may be determined by an application executed on the media device allowing a user or an image processing program to select one or more ROIs in the image region of video frames of a base stream. Thus the ROI may be predetermined based on user input received by the media device through a user interface.

The content selection module may use the information on the ROIs (e.g. ROI coordinates) and the so-called tile position information (as specified on the basis of spatial relation descriptors (SRDs)) in the manifest file to select one or more associated enhancement tile streams (as e.g. described with reference to FIG. 2). The tile position information will be described hereunder in more detail with reference to some manifest file examples.

The content selection module may forward the information on the selected enhancement tile streams, in particular URLs on the selected enhancement tile streams, to a content retrieval module, which retrieval module may be configured to transmit request messages 712 to one or more network nodes and to receive response messages 714 comprising parts of the requested media streams. In an embodiment, the client device may comprise an HTTP protocol stack and be configured for transmitting HTTP request messages to an HTTP media server and for receiving HTTP response messages comprising media data, preferably in the form of HTTP segments, of the requested one or more media streams.

The content retrieval module may further comprise one or more buffers for receiving the requested media data and to prepare the media data for input to a media engine 704 comprising a first decoder 722 (a base stream decoder) that is configured for decoding media data of the base stream that are encoded on the basis of a first codec, and a second decoder 724 (an enhancement tile stream decoder) for decoding media data of one or more enhancement tile streams that are encoded on the basis of a second codec. When the HEVC codec or another codec is used that allows for producing an encoded tiled video stream comprising a plurality of independently retrievable tiles in the form of enhancement tile streams, it is thus preferred that when a plurality of enhancement tile streams are selected, they have in common that they comprise media data that is encoded on the basis of one encoding process executed by one encoder (e.g. a HEVC encoder), whereby the encoding constraint is set such that they are independently decodable. The big advantage is that from such a set of enhancement tile streams, an arbitrarily subset may be selected, which may all be decoded by a single (complementary) decoder (e.g. in a single decoding process). This greatly simplifies the design and there is substantial gain in decoding and post-decoding resources, as less separate decoding processes, buffer instances, and post-decoding operations are required.

In particular, the content retrieval module may retrieve the payload of media data associated with a base stream in order to prepare a first bitstream that is provided to the input of a base stream decoder 722. Further, it may retrieve the payload of media data associated with one or more enhancement tile streams in order to prepare a second bitstream that is provided to the input of an enhancement decoder 724 supporting the tiling feature. In an embodiment, the media engine may use sequence information (e.g. extractors that are stored in a base track as explained with reference to FIG. 4) in order to combine and order VCL NAL units of the different received enhancement tile streams into an HEVC compliant bitstream.

The output of the media engine is connected to a video rending module 706 (also referred to as rendering device or rendering engine). In particular, the output of the base stream decoder is connected to a first video frame buffer 726 for buffering video frames of the base stream and the output of the enhancement tile stream decoder is connected to a second video frame buffer 728 for buffering (decoded) tiled video frames. The video rendering module further comprises a fusion module 734 configured to receive video frames of the first buffer and associated tiled video frames of the second buffer and configured to combine (fuse) these video frames into video frames comprising one or more enhanced ROIs, which are subsequently buffered into an output frame buffer for rendering.

In order to modify pixels in a ROI of a video frame of the base stream by either replacing them or blending them with pixels of the tiled video frame from an enhancement tile stream, pixel replacement information is provided to the fusion module. The pixel replacement information identifies pixels belonging to each of the ROIs.

In an embodiment, pixel replacement information may be implemented as a binary mask that is generated by a mask generator 721. As will be described hereunder in more detail, the mask generator may identify pixels belonging to one or more ROIs in the video frames of the base stream that need to be modified through being replaced by or blended with the pixels from the enhancement tile stream. To that end, the mask generator may generate a binary mask 733 on the basis the spatial relationship between the base stream and the enhancement tile streams. In particular, the mask generator may use the SRD information associated with the base stream and the selected enhancement tile streams in order to generate a bitmap identifying pixels of the one or more ROIs in the video frames of the base streams that need to be modified through being replaced by/blended with the pixels of the tiled video frames associated with the enhancement tile stream. The binary mask may be sent to the rendering engine, which may store the bitmask in a memory. The blending operation may be performed to actually lowering the quality difference between a ROI and its surroundings, as explained further in this application. Blending may be useful if the contrast between a low quality and a higher quality area within the image region of a frame needs to be lowered. Blending is performed on an area of overlap between the tiled video frames and the video frames from the base stream. However blending may be limited to a subregion of such area of overlap, for instance in a band near the borders of the area of overlap. One or more blending operations may be performed.

In embodiments of the invention, after the replacement or blending operation, the resulting video frame may be submitted to a filtering operation, as further described in this application, to smoothen the edges of the one or more ROI's. The various filtering operations as described in the application, may have a particular benefit in the field of VR (e.g. using head mounted displays) wherein it has a benefit to display a higher video quality in the centre viewing field than in the periphery viewing field. In such application, sharp edges between the various qualities are to be avoided as that would be detrimental to the user experience.

In certain situations, the video or picture characteristics of the video frames of the base and enhancement tile stream do not match. In that case, the video frames of the base stream may require an adjustment, e.g. downscaling or upscaling, adjustment of the colour scheme, frame rate, resolution, etc. Therefore, in an embodiment, the rendering engine may comprise an adjustment processor 730 which is configured to adjust the video and/or picture characteristics of video frames of the base stream so that the adjusted video frames of the base stream can be fused with the tiled video frames associated with one or more enhancement tile streams. In an embodiment, the rendering engine may comprise a frame buffer processor 731 configured for determining video and picture characteristics of the decoded tiled video frames in the second frame buffer. The determined video and picture characteristics (e.g. colour scheme, frame rate, resolution, etc.) may be provided to the input of the adjustment processor, which may use the information on the video characteristics of the tiled video frames of the enhancement tile stream. It is hereby submitted that a video characteristic is the frame rate of the video (media) stream, whereas a picture characteristic relates to a property of a particular frame (picture) in the video (media) stream, examples of which are colour scheme and resolution (e.g. pixel density).

FIG. 7 illustrates that the media data are processed by two functional layers (processes), the video decoding layer and the video rendering layer, which enable the media device to process media data in a base mode and an enhancement mode. In the base mode, only the base stream is consumed. The client device may retrieve the manifest file and parse it.

decoding. Decoded video frames in the decoder buffer are copied into the frame buffer of the rendering engine. Since no enhancement operation is needed, the video frames are passed on to the output frame buffer and are displayed as they are.

When the user or a software application executed by a processor of the media device selects one or more ROIs in the video frames of the base stream for enhancement, the client device may start retrieving segments (i.e. temporal segments of a tiled HEVC stream) of one or more enhancement tile streams that overlap or match the one or more ROIs. As already explained above, in an embodiment, the selection of the one or more enhancement tile streams may be based on the SRD information in the MPD that provides the spatial relationship between the base stream and the available enhancement tile streams.

Further, in an embodiment, the SRD information in the MPD may also be used by the mask generator in order to generate a binary mask for signaling the rendering engine, in particular a fusion module in the rendering engine, which pixels in the video frames of the base stream need to be modified (e.g. replaced or blended).

Such binary mask may be generated as follows:

```
// Initialise a matrix of the size of the reference frame of a tiled video
// frame (i.e. the full size of a tiled video frame)
binary_mask = new matrix(enhancement_stream.width, enhancement_stream.heigth)
// Set the values to 1 by default. 1 means keeps the pixels, 0 means
// replace the pixel
for(i in 0 . . . binary_mask.width*binary_mask.heigth-1) binary_mask[i] = 1;
// Loop over the selected tiles.
for(tile in selected_tiles) {
  // Loop over the rows of tile.
  for(i in 0 . . . tile.heigth) {
  // Loop over the columns of tile.
    for(j in 0 . . . tile.width) {
    // Set the mask value to 0 to identify this pixels of the base stream to be replaced.
      binary_mask[i + tile.x][j +tile.y] = 0
    }
  }
}
```

Here, the tile structure and the mask structure in the above pseudo code may be copied from the values provided by the corresponding SRD of the MPD, as illustrated in the following example:

```
<SupplementalProperty schemeIdUri="urn:mpeg:dash:srd:2014" value="1, 1920, 0, 1920,
1080, 3840, 2160, 2"/>
Tile {
  int x = 1920
  int y = 0
  int width = 1920
  int height = 1080
}
Binary_mask {
  int x = 0
  int y = 0
  int width = 3840
  int heigth = 2160
}
```

A user may select a base stream to be played out which subsequently triggers the client device to retrieve the corresponding segments (e.g. segments of a conventional (non-tiled) HEVC stream). Media data associated with retrieved segments are fed to the input of the media engine for Once the segments of the one or more enhancement tile streams are retrieved, the media data are decoded and the one or more tiled video frames are stored in the decoder buffer. Thereafter, the tiled video frames are copied into a frame buffer of the rendering stack.

The tiled video frames that are generated on the basis of the media data of the enhancement tile streams are configured to enhance one or more ROIs in the video frames of the base stream. As a result, the output frame buffer needs to be configured such that it can contain all information of the frame buffer comprising the tiled video frames. Therefore, when the media device is operating in the enhancement mode, the output frame buffer is configured such that it has a size, refresh rate, colour depth, etc. that is at least equal to the configuration of the frame buffer of the tiled video frames so that loss of enhancement (e.g. subjected quality loss or resolution loss is avoided). As a consequence, the video (frames) resulting from the base stream need to be adjusted (modified) so that it/they fit(s) in the output frame buffer. For example, for adjusting the resolution, the video frames of the base stream may be up scaled to the resolution of the tiled video frame of the one or more selected enhancement tile streams;

This way a picture characteristic of the (decoded) base stream is adjusted to match that of the one or more enhancement tile streams.

For matching the frame rate (e.g. up-scaling the frame rate), additional video frames may be inserted in the sequence of decoded video frames from the selected base stream, wherein the additional video frames are generated by interpolation. This way a video characteristic of the (decoded) base stream is adjusted to match that of the one or more enhancement tile streams. For adjusting the colour-coding scheme, the colour space may be transformed, pixel values may be converted, interpolated, etc.

Any other operations required for matching the video and/or picture characteristics of the video frames of the base stream with the characteristic of the tiled video frames associated with the enhancement tile streams need to be applied before performing the fusion of the video frames (e.g. before pixel replacement or blending). To this end, the video and picture characteristics may be extracted from the enhancement tile stream and passed along to an adjustment module in the rendering device/engine.

The adjusted video frames of the base stream, the tiled video frames associated with the enhancement tile streams and the binary mask for identifying the ROI pixels are then forwarded to the input of the fusion module, which is also part of the rendering device/engine. In an embodiment, the fusion operation executed by the fusion module may comprise a matrix operation:

$$Frame_{output} = Frame_{Base} \circ Mask + (J - Mask) \circ Frame_{Enh}$$

Where $\circ$ is the element-wise product (also known as Hadamard product) and $Frame_{Display}$ is stored in the output frame buffer for being displayed to the user. Here, J is matrix of the size of Mask wherein each matrix elements has the value one. $Frame_{output}$, $Frame_{Base}$, Mask and $Frame_{Enh}$ have the same dimensions as J.

The processes executed by the rendering engine may be synchronized on the basis of time information, which may for example be present in MPEG streamsas presentation timestamps, associated with video frames in the base stream and the tiled video frames associated with the enhancement tile streams. This time information may be used by the rendering engine in order to ensure that a video frame of the base stream is fused with its associated tiled video frame.

Figure 8:
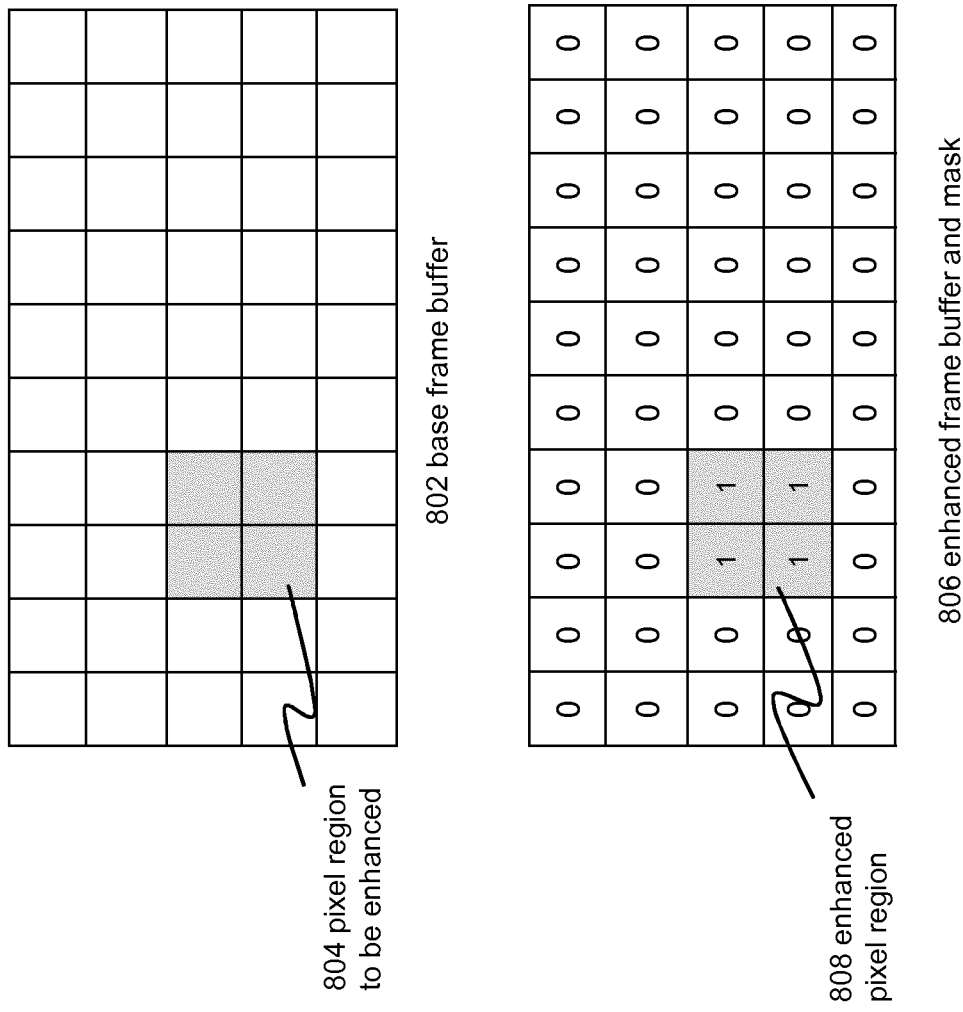
FIG. 8 schematically depicts a fusion process according to an embodiment of the invention.

FIG. 8 schematically depicts a fusion process according to an embodiment of the invention. In this particular embodiment, the video frames of the base stream and the tiled video frames associated with one or more enhancement tile streams may have the same video and picture characteristics and the only difference is the quality (the SNR) in which the video frames of the base stream and enhancement tile streams have been encoded. In that case, the enhancement tile streams may enhance the ROIs in the base stream with an improved subjective quality (when compared to the subjective quality of the base stream). This may be the case, for example, when the same video coding standard (codec) is used for both streams, the enhancement tile stream may have been encoded in a higher bitrate (i.e. more information per unit of time) hence yielding a higher subjective quality. Alternatively, for the same bitrate, the enhancement tile streams may have been encoded with a video coding standard offering a better compression efficiency, hence yielding a higher subjective quality (subjective since the end-result is to improve the visual experience of the user).

Due to the fact that in this embodiment the video frames of the base stream and the enhancement tile streams have the same video and picture characteristics, the video frames of the base stream do not need to be adjusted prior to the fusion operation. Hence, the fusion operation may start with copying the content of the first (base) video frame buffer 802 (comprising pixel values of a video frame of the base stream, the video frame comprising at least one pixel region 804 (one or more groups of pixels) that needs to be enhanced (a ROI)) into the output frame buffer (not shown). Thereafter, the rendering engine may overwrite the pixel values of the pixel region in the output frame buffer with pixel values at corresponding pixel positions 808 in the second (enhancement) video frame buffer 806. Alternatively the aforementioned sets of pixel values may be blended through a blending operation. In order to only copy the relevant pixel values from the enhanced frame buffer into the output frame buffer, a binary mask may be transmitted to the fusion module. The binary mask indicates for each pixel or group (s) of pixels in the enhanced frame buffer whether or not such pixel or group(s) of pixels needs to be copied into the output frame buffer. For example, in FIG. 8 the binary mask may comprise a binary value for each pixel in the output frame buffer. Pixels in the enhanced frame buffer associated with a first binary value, e.g. "1", may be identified by the rendering engine as pixels that need to be copied into the output frame buffer and pixels associated with a second binary value, e.g. "0", may be identified by the rendering engine as pixels that are not copied into the output frame buffer. It is noted that FIG. 8 illustrates the process for one channel of the video component.

Figure 9:
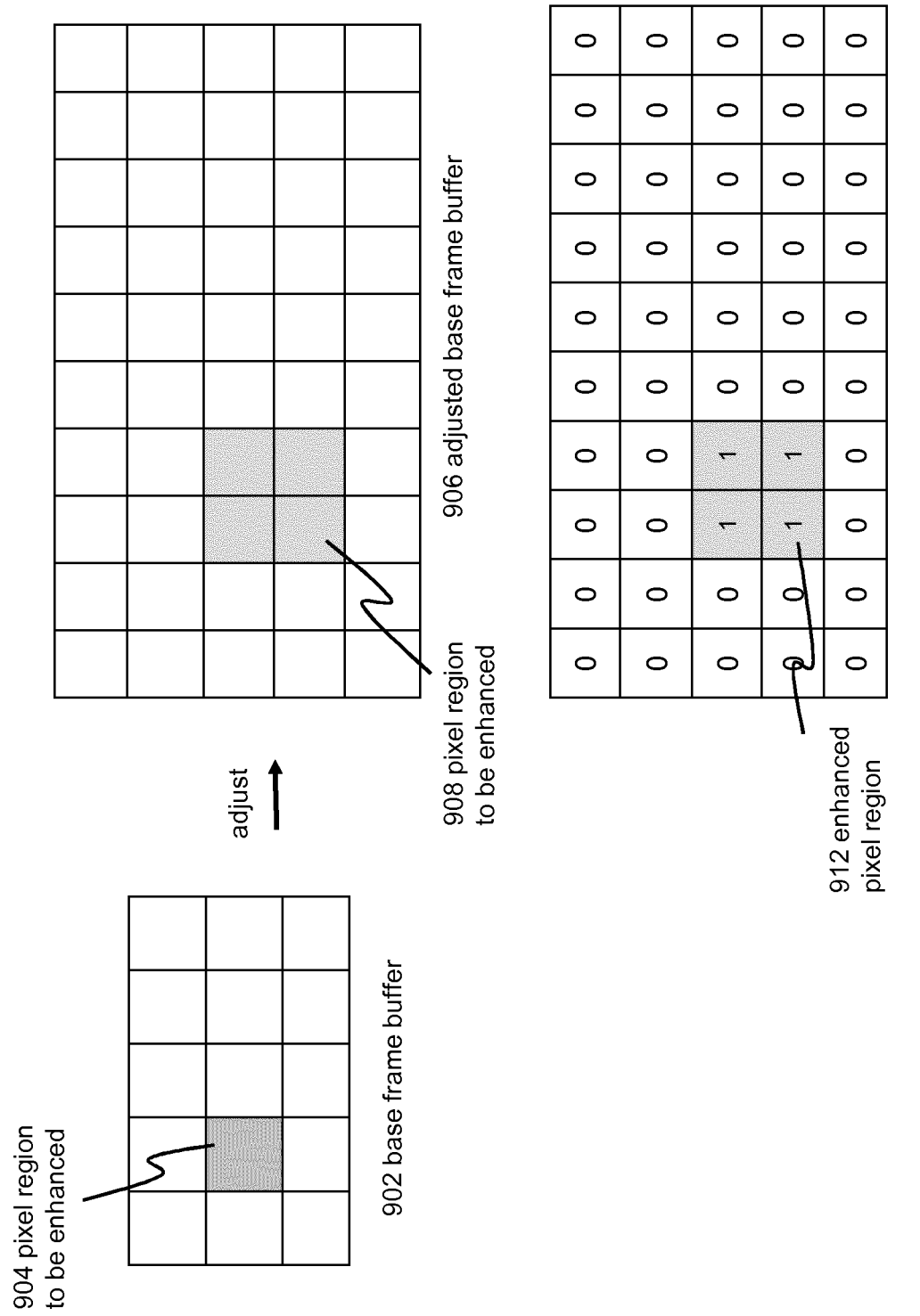
FIG. 9 schematically depicts a fusion process according to another embodiment of the invention.

FIG. 9 schematically depicts a fusion process according to an embodiment of the invention. In this particular embodiment, a first video frame buffer 902 for video frames of the base stream (comprising a pixel region 904 that needs to be enhanced) is of different size (e.g. smaller) than the size of second video frame buffer for the tiled video frames associated with the enhancement tile streams. In that case, before starting the fusion process, the rendering device may initialize the size of the output frame buffer to match the size of the enhanced frame buffer.

Further, the video frame stored in the first video frame buffer (a base video frame buffer) may be adjusted (in this case upscaled) and the upscaled video frame comprising an upscaled pixel region 908 that needs to be enhanced may be stored in an adjusted first video frame buffer 906. A bitmask for identifying pixels of the adjusted (in this case upscaled) pixel region may be generated on the basis of the adjusted video frame. Thereafter, the fusion process may start with copying the content of the adjusted first video frame buffer into the output frame buffer and overwriting or blending the pixel values of the pixel region in the output frame buffer that need to be enhanced with pixel values at corresponding pixel positions in the second video frame buffer (the enhancement video frame buffer) on the basis of a binary mask in a similar way as described with reference to FIG. 8.

The main benefit of the fusion process as described with reference to FIGS. 8 and 9 is that the decoding and fusion operations can be asynchronously performed. In particular, the read and write access to the frame buffers may be conditioned by the grant of a lock. If a resource (e.g. a video frame buffer) is locked for writing, the decoding process must wait for the resource to be released by the other process (e.g. the reading of the video frame buffer by the fusion process).

Generally, a video may comprise three or more colour channels (sometimes more in more complex colour spaces) in order to reconstruct colour information. Hence, the operations described with reference to FIGS. 8 and 9 may need to be applied for one or more, but preferably for each colour channel.

It is well known that the human visual system is less sensitive to high frequencies in the colour space compared to black-and-white represented information. For that reason, typically the luminance channel is encoded in a higher resolution that chrominance information. Hence, in one embodiment, the enhancement tile streams may only comprise enhanced luminance information (since enhancing chrominance information will have little impact on the subjective quality). In that case the fusion operation as described with reference to FIGS. 8 and 9 is only executed for one colour channel, that is the luminance channel.

In embodiments of the invention, signalling of some of the post decoding operations, such as adjustment of the video and picture characteristics of the base stream (upscaling) and potentially of the enhancement tile streams (downscaling) and the replacement operations, may be achieved using the ISO/IEC 14496-12, a.k.a. the ISOBMFF standard, provided both the enhancement tile streams and the base stream are stored in separate tracks in the same file format structure according to the ISOBMFF standard.

In particular, a TrackHeaderBox which is part of the metadata structures defined by this standard, of the base stream, may be configured to contain the width and height attributes with the values of the width and height of the pixel dimension that matches the pixel dimension of an enhancement tile stream the base stream is associated with. As specified in the ISOBMFF standard, this signals the media engine to upscale the base stream pictures (frames) to this given pixel dimension before presentation. This way, the pixel dimension of a base stream can be 'artificially' matched with the pixel dimension of the enhancement tile stream for the region where they overlap, which allows, in one embodiment, for forming video frames comprising an enhanced region of interest, by simple replacement.

In an alternative embodiment, the attribute matrix of the TrackHeaderBox of the base stream track, as described in this standard, may be used to signal the pixel coordinate operation to perform. This matrix has as input the coordinates of the pixel in the decoded frames and as output the coordinates of the pixels in the transformed frame for rendering. Essentially, this specifies a transformation of video images (frames) for presentation. According to an embodiment, the matrix may be configured to provide coefficients for an upsampling transformation that matches the pixel dimension of the enhancement tile stream associated with the base stream track. For instance, the matrix {2,0,0, 0,2,0, 0,0,1} would upscale (e.g. upsample) the decoded frame by a factor 2. The interpolation of the pixel values would be left up to the media engine.

In a further use of the standard, the TrackHeaderBox of the base stream track may be configured to contain the value 0 for the attribute layer and the TrackHeaderBox of an enhancement tile stream may be configured to contain the value −1 for the attribute layer. According to the ISOBMFF specification, this instructs the media engine to overlay the enhancement tile stream on top of the base stream. Of course there can be a plurality of enhancement tile streams being signaled through their respective TrackHeaderBoxes to have this value set to −1.

In further embodiments according to the invention, the usage of the layer attribute alone may not be satisfactory, as it may not trigger the actual merging of the video frames of the base stream and one or more tiled video frames from one or more enhancement tile stream into one new frame.

Moreso, when presenting content with different visual quality to the user by overlaying operations, in certain embodiments one may want to ensure that the gap in visual quality between an enhanced region and the remaining 'not enhanced' part of the image region is not too large.

In particular in the field of VR, Virtual Reality, sharp artificial boundaries between an enhanced region and a non-enhanced region, may not be acceptable. For example when watching a 360 video, it is acceptable that parts of the video at the edges of the view of a user are less in quality than in a more central area of the view point of a user. However too sharp boundaries will lead to a lower perceived Quality of Experience. As a result, it may be advantageous to signal an actual blending operation of the video frames of the base streams and the tiled video frames of the enhancement tile streams, to be performed after decoding.

The blending operation is to be viewed as a special pixel modification operation, whereby at least part of the pixel values of the visual content of the at least one region of interest in the video frames of a base stream is blended with at least part of the pixel values of the enhanced visual content of the tiled video frames.

To this end, a new blending parameter, for example called "blending", to be applied in the TrackHeaderBox, is defined. This blending parameter may be defined to provide the percentage, or the weight, of the pixels from the upper layer (e.g. from the one or more enhancement tile streams) to be kept in the blending operations. For example, for a full blending of the enhancement tile stream in the base stream (resulting in a 100% pixel replacement), the TrackHeaderBox of the enhancement tile stream may be configured with a blending parameter of value "100". In such configuration a pixel of the blended frame may be computed as $p=(100-100)*p_{base\_stream}+100*p_{enhancement\ tile\ stream}$.

In such embodiment the layer attribute (parameter) in the TrackHeaderBox can be used to indicate which track is to be defined as the upper layer.

Alternatively, the blending parameter may be defined as a floating point denoting the blending percentage normalized between 0 and 1.

In a further embodiment the use of a filtering (e.g. convolution) operation may also be signaled to attenuate, if undesired, a sharp and too large gap in quality between regions (e.g. between an enhanced region of interest and the remainder of the image area of a frame), which gap may (still) be present after a simple pixel substitution operation or after a blending operation. To this end, a new "filtering" parameter, for example called "filter", may be defined, and optionally provided in the MovieHeaderBox according to the ISOBMFF standard, preferably associated with an enhancement tile stream. This parameter may signal applying of a convolution operation of the given filter, using a convolution matrix, on the pixels of the frame resulting from the blending operation or resulting from the simple pixel substitution operation as described above.

In a further embodiment the filtering operation may be limited to the pixel boundaries of the region affected by substitution or blending only, for example by signaling a further 'filter range' parameter in the MovieHeaderBox called for example "filtering_at_boundaries". This filter range parameter could be defined so as to limit the filtering operation to those pixels for which a convolution matrix still covers pixels from the region affected by substitution or blending. In the prior art convolution matrixes used for filtering are known covering for example a 3 by 3 or 5 by 5 pixel area, which may be used here. For example, using the filter range parameter with a 3 by 3 filter convolution matrix would thus signal such matrix to be applied to all pixels in a band of two pixels directly on the outside boundary of the affected region and to a band of two pixels directly on the inside of the boundary of the affected region. Optionally a further 'filter band' parameter could increase the band of pixels to which the convolution matrix should be applied in the filtering operation. This parameter could be denoted in a value signaling the additional band size in number of pixels for the which the filtering operation would apply in addition to the implicit band signaled as above. This additional band parameter could be one parameter signaling appliance to both pixels on the inside or on the outside of the boundary of the affected region, or it could be used, by convention, to signal two values, one for pixels on the inside or on the outside of the boundary of the affected region.

In the above described embodiments various parameters are defined for signaling post decoding operations using the ISO BMFF standard, by proposing some modifications to it. Alternatively the various parameters may be signaled in other ways, such as through incorporation in a manifest file, possibly associating them with representations of base streams and/or enhancement tile streams inside said manifest file.

It may even be possible to signal these parameters in the metadata specific to the codec, e.g. the HEVC codec, itself, e.g. by incorporating one or more of these parameters in one or more SEI messages that may be part of the bitstream representing a base stream or an enhancement tile stream.

Figure 10:
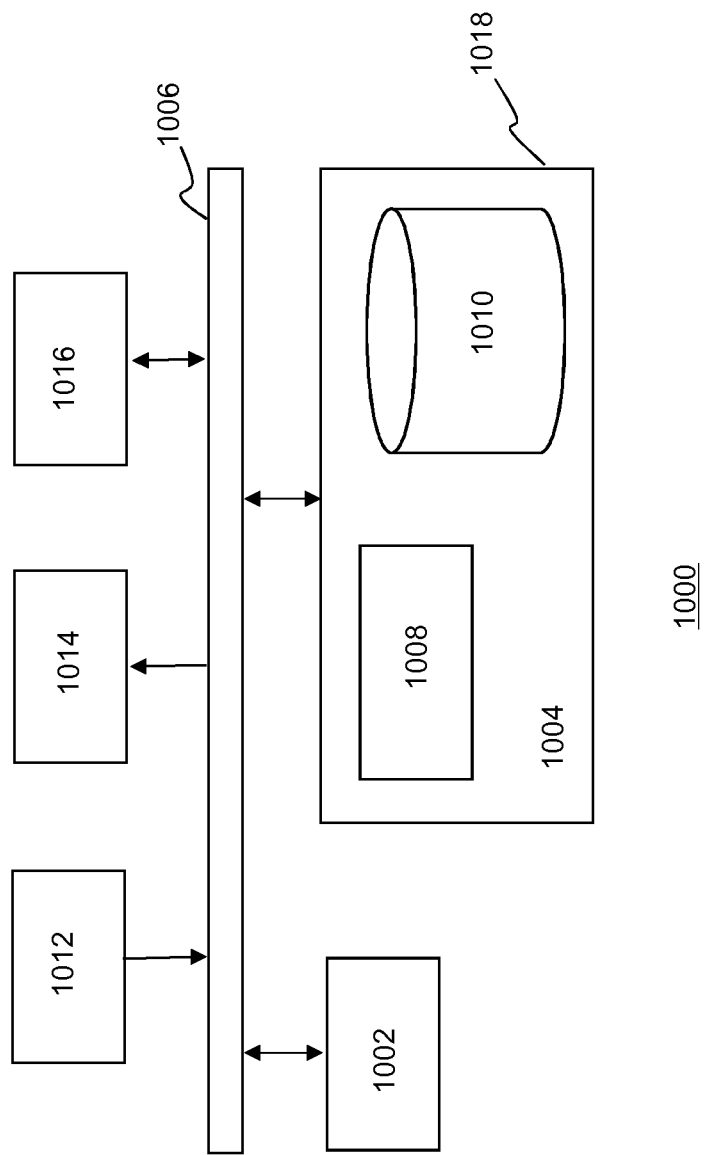
FIG. 10 is a block diagram illustrating an exemplary data processing system that may be used in method and system described in this disclosure.

FIG. 10 is a block diagram illustrating an exemplary data processing system that may be used in method and system described in this disclosure. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1050.

As pictured in FIG. 10, memory elements 1004 may store an application 1018. It should be appreciated that data processing system 1000 may further execute an operating system (not shown) that can facilitate execution of the application. Application, being implemented in the form of executable program code, can be executed by data processing system 1000, e.g., by processor 1002. Responsive to executing application, data processing system may be configured to perform one or more operations to be described herein in further detail.

In one aspect, for example, data processing system 1000 may represent a media device data processing system (e.g. a media device). In that case, application 1018 may represent one or more applications that, when executed, configures data processing system 1000 to perform the various functions described herein with reference to a "client device", "a media engine", "decoder", or "rendering device". Examples of a media device can include, but are not limited to, a personal computer, a portable computer, a mobile phone, or the like.

In another aspect, data processing system may represent a server. For example, data processing system may represent an (HTTP) server in which case application 1018, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Method for enhancing at least one region of interest in video frames of a video stream, the method comprising:
    receiving, by a client device, media data defining base video frames of at least one base stream, said base stream being associated with one or more enhancement tile streams, wherein an enhancement tile stream comprises media data defining tiled video frames, a tiled video frame comprising a tile associated with media data for enhancing visual content in a subregion of an image region of a base video frame, wherein media data of an enhancement tile stream are independently decodable from the media data of said base stream;
    requesting, by the client device, media data of one or more enhancement tile streams, the one or more tiles of the tiled video frames of the requested media data being associated with at least one predetermined region of interest in the image region of the base video frames;
    generating, by a first decoder connected to the client device, base video frames on the basis of the media data of the at least one base stream and a second decoder connected to the client device generating tiled video frames on the basis of the media data of the one or more enhancement tile streams, the generated tiled video frames comprising one or more tiles forming enhanced visual content in the at least one region of interest; and,
    forming, by a rendering device, video frames comprising an enhanced region of interest by modifying at least part of the visual content of the at least one region of interest in the video frames of said base stream on the basis of at least part of the enhanced visual content of the tiled video frames, said modifying comprising replacing or blending at least part of the visual content of the at least one region of interest in the video frames of said base stream with at least part of the enhanced visual content of the tiled video frames;
    wherein said media data are requested by the client device on the basis of a manifest file comprising at least one base stream identifier and one or more enhancement tile stream identifiers associated with the at least one base stream identifier; the manifest file further comprising tile position information for signaling the client device on the spatial relation between visual content in the video frames of said base stream and visual content in the tiles of the tiled video frames of said one or more enhancement tile streams.

2. Method according to claim 1 wherein the position information comprises one or more spatial relationship descriptors (SRDs), a spatial relationship descriptor being associated with said base stream and/or an enhancement tile stream, the spatial relationship descriptor signaling the client device about the position of the visual content in the video frames of the base stream and/or about the position of a tile in the tiled video frames of the tiled enhancement tile stream.

3. Method according to claim 1 wherein the manifest file further comprises enhancement information associated with at least one of the one or more enhancement tile streams, the enhancement information being configured for signaling the client device about the type of enhancement provided by an enhancement tile stream, and, optionally, for providing the client device one or more enhancement parameters associated with at least one of the resolution, bitrate, color depth, frame rate of the one or more enhancement tile streams defined by said enhancement tile stream identifiers.

4. Method according to claim 1 comprising:
    determining ROI position information associated with the position of the at least one region of interest in the video frames of said base stream;
    determining one or more enhancement tile streams on the basis of the ROI position information and the tile position information.

5. Method according to claim 1 further comprising:
    determining pixel replacement information for signaling the rendering device about pixels in the video frames of the base stream which are associated with the least one region of interest in the video frames of the base stream;
    the rendering device using the pixel replacement information for replacing or blending pixel information in at least part of the at least one region of interest in the video frames of the base stream with associated pixel information of the enhanced visual content of the tiled video frames.

6. Method according to claim 5 wherein the pixel replacement information is at least partly determined on the basis of tile position information in a manifest file.

7. Method according to claim 1 wherein said forming comprises:
    prior to said modifying, adjusting said base video frames on the basis of information on the video and/or picture characteristics of the tiled video frames of the one or more enhancement tile streams.

8. Method according to claim 1 wherein the media data associated with a tile in a first tiled video frame are encoded such that the media data do not have any spatial decoding dependency on the media data of one or more other tiles in the first tiled video frame; and/or, wherein the media data associated with the tile are encoded such that the media data do not have any temporal decoding dependency on media data of other tiles in one or more tiled video frames preceding the first tiled video frame or following the first tiled video frames.

9. Method according to claim 1 wherein an enhancement tile stream comprise media data with enhanced luminance information.

10. Method according to claim 1 wherein modifying at least part of the visual content of said at least one region of interest comprises:
    copying the content of a first video frame buffer comprising a video frame of the base stream into an output frame buffer of the media device;
    overwriting or blending pixel values associated with the at least one region of interest in the output frame buffer with pixel values at corresponding pixel positions in a second video frame buffer comprising a tiled video frame associated with one or more enhancement tile streams, wherein a binary mask indicates which pixels values in the second video frame buffer needs to be copied into the output frame buffer.

11. Method according to claim 1
wherein said one or more enhancement tile streams are formatted on the basis of a data container of a media streaming protocol or media transport protocol, an (HTTP) adaptive streaming protocol or a transport protocol for packetized media data; and/or,
wherein media data of the one or more enhancement tile streams are encoded on the basis of a codec supporting tiled video frames; and/or,
wherein media data of the one or more enhancement tile streams defined by the one or more enhancement tile stream identifiers are stored in (tile) tracks and wherein metadata associated with at least part of the one or more enhancement tile streams are stored in at least one base track.

12. A computer comprising:
a non-transitory computer readable storage medium having computer readable program code embodied therewith, and a processor coupled to the non-transitory computer readable storage medium, wherein responsive to executing the computer readable program code, the processor is configured to perform executable operations comprising:
receiving media data defining base video frames of at least one base stream, said base stream being associated with one or more enhancement tile streams, wherein an enhancement tile stream comprises media data defining tiled video frames, a tiled video frame comprising a tile associated with media data for enhancing visual content in a subregion of an image region of a base video frame, wherein media data of an enhancement tile stream are independently decodable from the media data of said base stream;
requesting media data of one or more enhancement tile streams the one or more tiles of the tiled video frames of the requested media data being associated with at least one predetermined region of interest in the image region of the base video frames;
generating base video frames on the basis of the media data of the at least one base stream and generating tiled video frames on the basis of the media data of the one or more enhancement tile streams, the generated tiled video frames comprising one or more tiles forming enhanced visual content in the at least one region of interest; and,
forming video frames comprising an enhanced region of interest by modifying at least part of the visual content of the at least one region of interest in the video frames of said base stream on the basis of at least part of the enhanced visual content of the tiled video frames, said modifying comprising:
replacing or blending at least part of the visual content of the at least one region of interest in the video frames of said base stream with at least part of the enhanced visual content of the tiled video frames;
wherein said media data are requested on the basis of a manifest file comprising at least one base stream identifier and one or more enhancement tile stream identifiers associated with the at least one base stream identifier; the manifest file further comprising tile position information for signaling on the spatial relation between visual content in the video frames of said base stream and visual content in the tiles of the tiled video frames of said one or more enhancement tile streams.

13. Non-transitory computer-readable storage media comprising a data structure for enabling enhancement of a region of interest in video frames of a video stream, said data structure comprising computer readable program code, said code comprising:
at least one base stream identifier and one or more enhancement tile stream identifiers associated with the at least one base stream identifier, configured for enabling a client device to request a base stream and/or one or more enhancement tile streams;
tile position information configured for signaling the client device on the spatial relation between visual content in the video frames of the base stream and visual content in the tiles of the tiled video frames of the one or more enhancement tile streams, a spatial relationship descriptor being associated with said base stream and/or an enhancement tile streams, the spatial relationship descriptor configured for signaling the client device about the position of the visual content in the video frames of the base stream and/or about the position of a tile in the tiled video frames of the tiled enhancement tile stream; and, optionally,
enhancement information associated with at least one of the one or more enhancement tile streams, the enhancement information configured for signaling the client device about the type of enhancement provided by an enhancement tile stream, and, optionally, for providing the client device one or more enhancement parameters associated with at least one of the resolution, bitrate, color depth, frame rate of the one or more enhancement tile streams defined by said enhancement tile stream identifiers.

14. Non-transitory storage medium comprising a computer program product, the computer program product comprising software code portions configured for, when run in the memory of a computer, executing the method steps according to claim 1.

* * * * *